(12) United States Patent
Doble et al.

(10) Patent No.: US 6,257,997 B1
(45) Date of Patent: Jul. 10, 2001

(54) ADJUSTING STIFFNESS AND FLEXIBILITY IN SPORTS EQUIPMENT

(75) Inventors: William C. Doble, Essex Junction, VT (US); Robert Walsh, Matawan, NJ (US); Guy Wheeler, Redding, CT (US); Peter Tarlton, Oceanport, NJ (US)

(73) Assignee: Alliance Design and Development Group, Keyport, NJ (US)

( * ) Notice: Subject to any disclaimer, the term of this patent is extended or adjusted under 35 U.S.C. 154(b) by 0 days.

(21) Appl. No.: 09/376,608

(22) Filed: Aug. 18, 1999

(51) Int. Cl.[7] .............................. A63B 53/00; A63B 59/12
(52) U.S. Cl. .................... 473/516; 473/524; 473/564; 473/560; 473/318
(58) Field of Search ................... 473/516, 559, 473/318, 323; 280/601, 602, 610

(56) References Cited

U.S. PATENT DOCUMENTS

| | | |
|---|---|---|
| Re. 31,419 | 10/1983 | Frolow . |
| 3,300,226 | 1/1967 | Reed, Jr. . |
| 3,461,593 | 8/1969 | Martuch et al. . |
| 3,612,121 | 10/1971 | Estwing . |
| 3,833,219 | 9/1974 | Dean . |
| 3,833,223 | 9/1974 | Shulkin . |
| 3,913,918 | 10/1975 | Trachtman . |
| 3,940,134 | 2/1976 | Bieganowski . |
| 4,024,666 | 5/1977 | Carver . |
| 4,082,273 | 4/1978 | Ellzey . |
| 4,105,205 | 8/1978 | Theodores et al. . |
| 4,159,114 | 6/1979 | Ardell et al. . |
| 4,221,400 | 9/1980 | Powers . |
| 4,358,113 | 11/1982 | McKinnon et al. . |
| 4,577,886 | 3/1986 | Chernega . |
| 4,685,682 | 8/1987 | Isabell . |
| 4,738,046 | 4/1988 | Fraylick et al. . |
| 4,854,596 | 8/1989 | Carbonetti . |
| 5,108,114 | 4/1992 | Marx . |
| 5,244,442 | 9/1993 | Schill . |
| 5,409,216 | 4/1995 | Brown . |
| 5,454,562 | 10/1995 | Sommer . |
| 5,456,650 | 10/1995 | Williams, Jr. et al. . |
| 5,520,386 | 5/1996 | Sasko . |
| 5,641,162 | 6/1997 | Brown . |
| 5,879,250 | 3/1999 | Tähtinen et al. . |
| 6,113,508 * | 9/2000 | Locarno et al. ............... 473/516 |

* cited by examiner

Primary Examiner—Raleigh W. Chiu
(74) Attorney, Agent, or Firm—Colbrin & Gittes

(57) ABSTRACT

A sports apparatus with variable directions of stiffness and flexibility, including sports equipment having a body; and a flexure resistance spine that is elongated and is stiffer and less flexible in one direction than in a different direction. The spine is fixed against rotation at two spaced apart locations along the body.

26 Claims, 23 Drawing Sheets

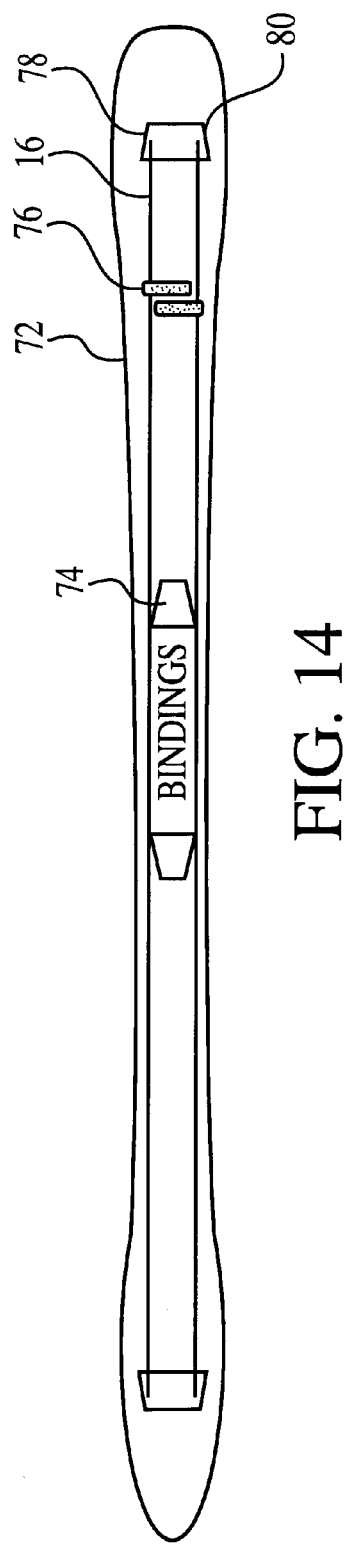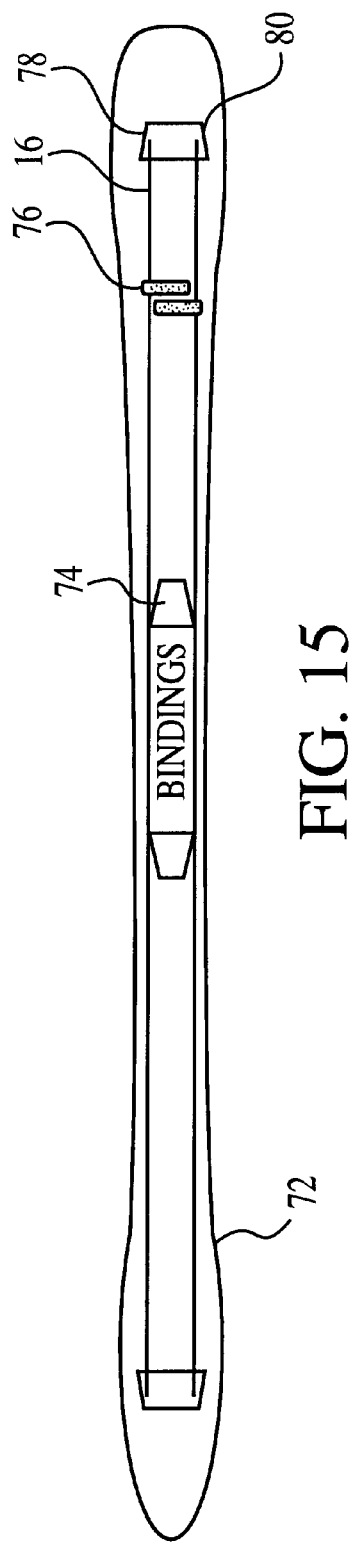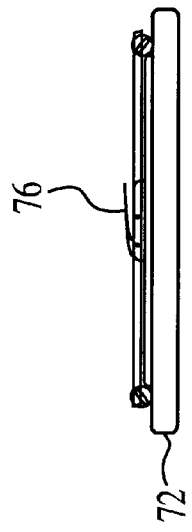

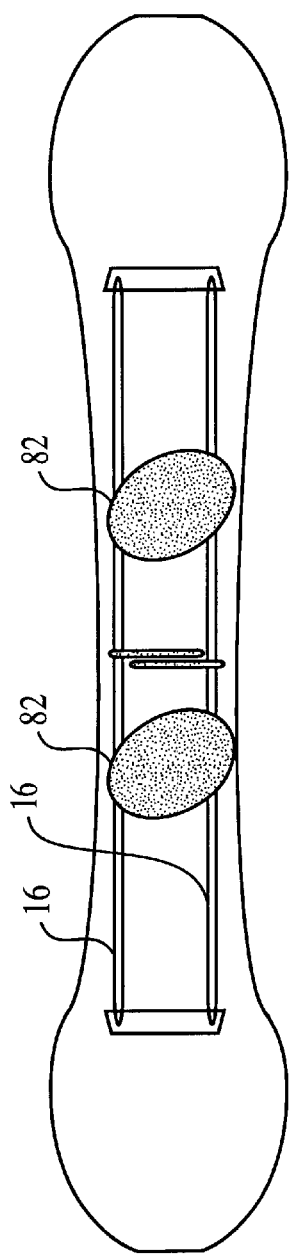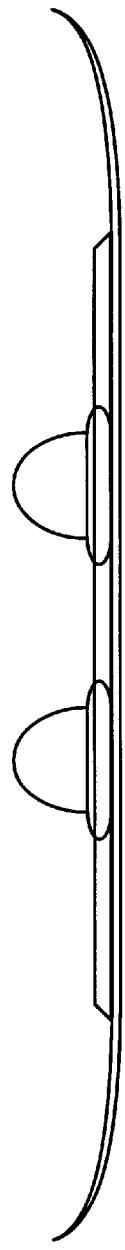

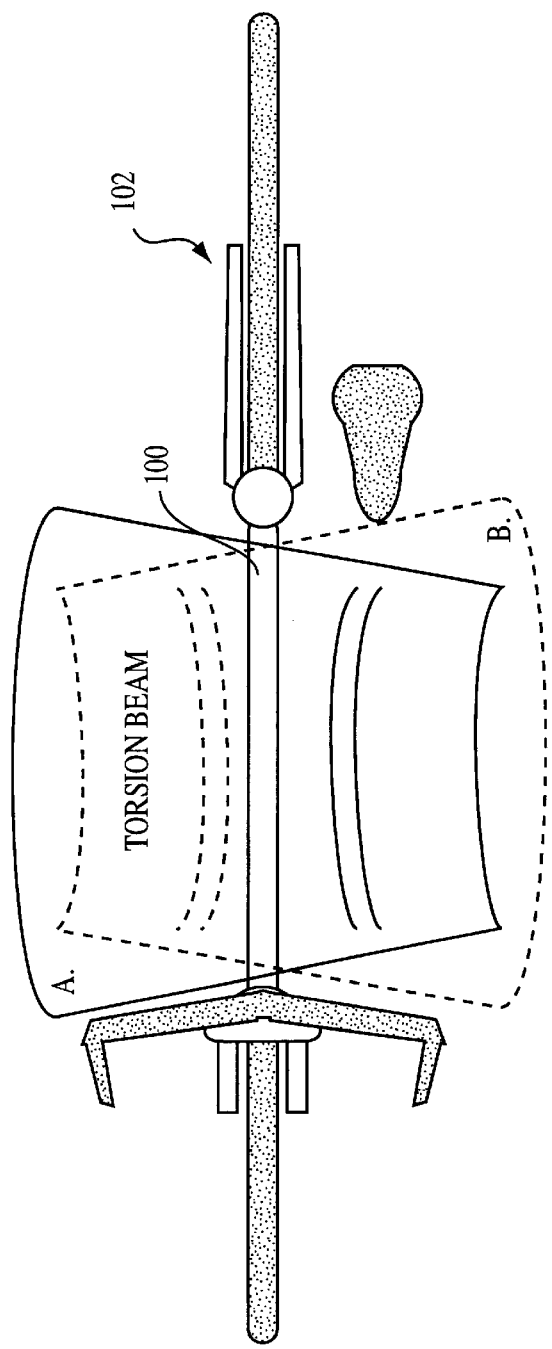
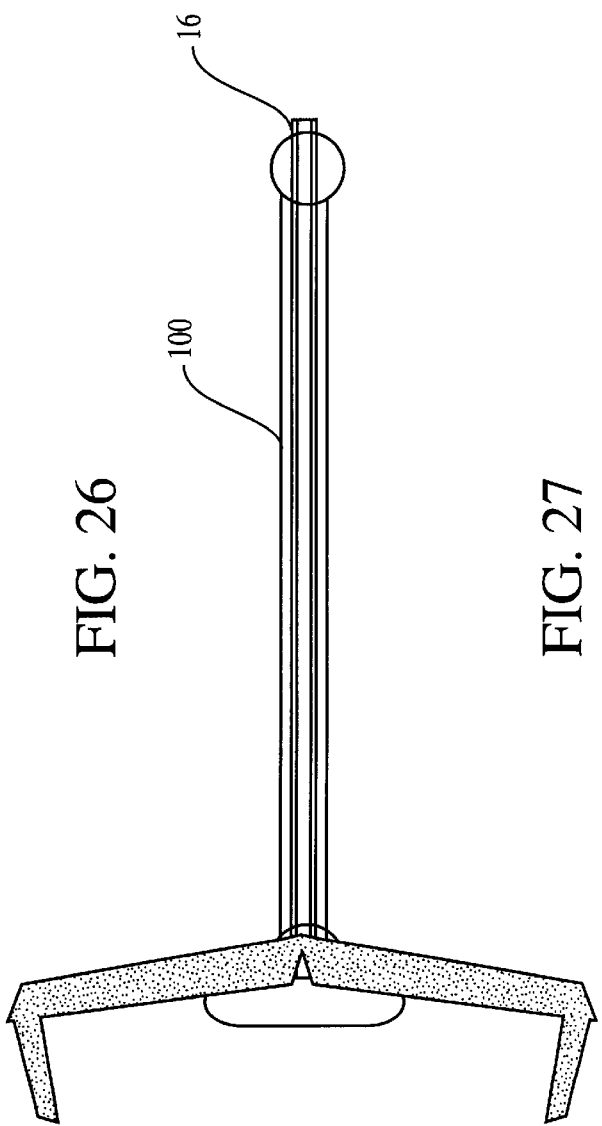
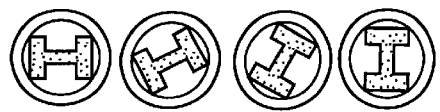
FIG. 26
FIG. 27
FIG. 28

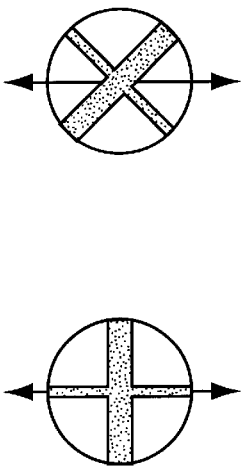
MAX RIGIDITY
@ 0 DEG.
MID RIGIDITY
@ 90 DEG.
MINIMUM RIGIDITY
@ 45 DEG.
FIG. 41
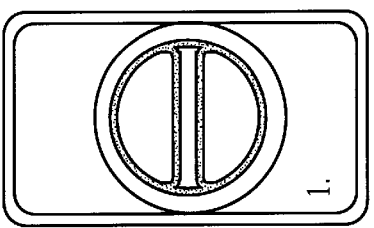
1.
MAX RIGIDITY
MIN FLEX
@ 0 DEGREES
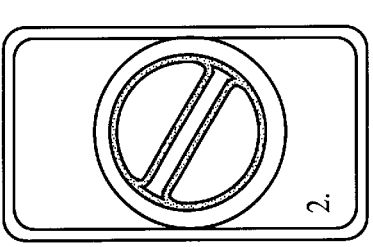
2.
@ +30 DEGREES
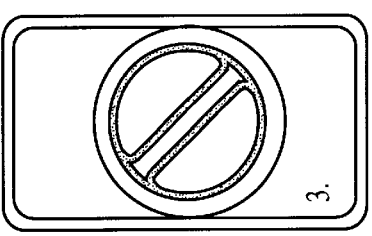
3.
@ +45 DEGREES
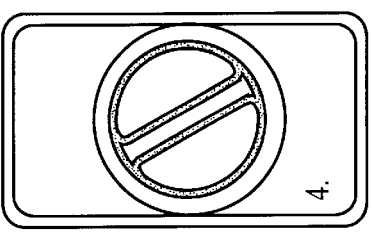
4.
@ +60 DEGREES
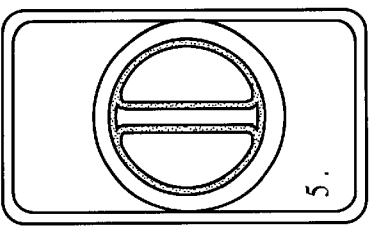
5.
MIN RIGIDITY
MAX FLEX
@ 90 DEGREES
FIG. 42

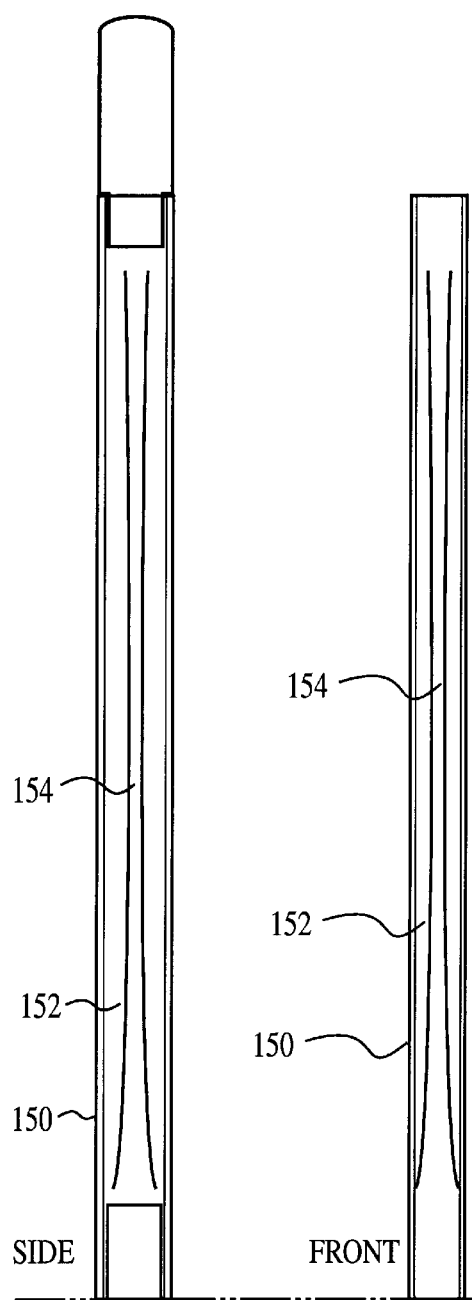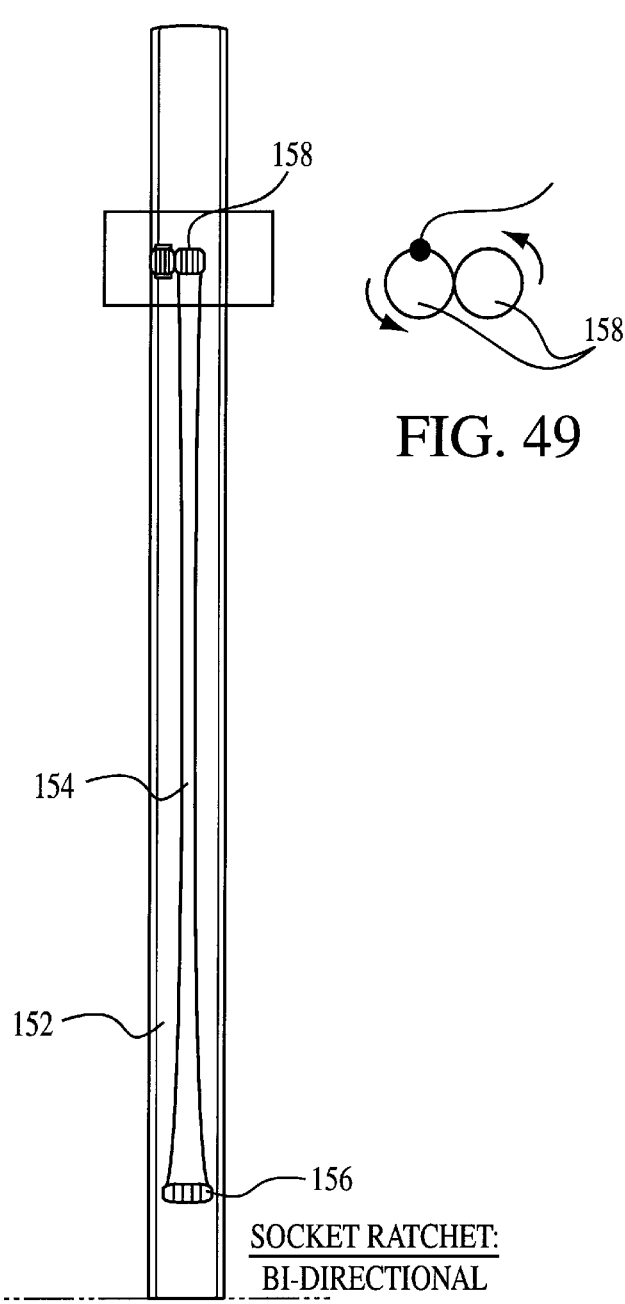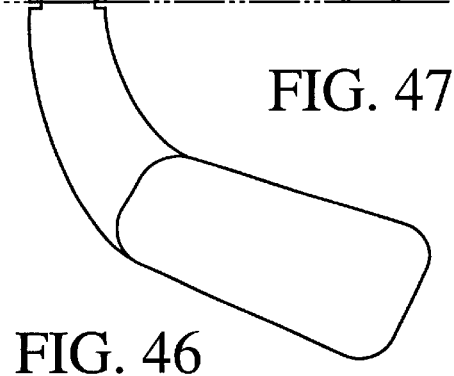
FIG. 49
SOCKET RATCHET:
BI-DIRECTIONAL
FIG. 47   FIG. 48
FIG. 46

ADJUSTING STIFFNESS AND FLEXIBILITY IN SPORTS EQUIPMENT

CROSS REFERENCE TO RELATED PATENT APPLICATIONS

Ser. No. 09/136,117 filed Aug. 18, 1998, now U.S. Pat. No. 6,113,508, whose contents are incorporated herein by reference.

STATEMENT REGARDING FEDERALLY SPONSORED RESEARCH OR DEVELOPMENT

Not Applicable.

BACKGROUND OF THE INVENTION

1. Field of the Invention

The invention relates to a sports apparatus whose degree and direction of stiffness and flexibility may be varied or dynamically controlled.

2. Discussion of Related Art

In recent years, sports equipment manufacturers have increasingly turned to different kinds of materials to enhance their sporting equipment. In so doing, entire lines of sports equipment have been developed whose stiffness or flexibility characteristics are but a shade different from each other. Such a shade of difference, however, may be enough to give the individual equipment user an edge over the competition or enhance sports performance.

The user may choose a particular piece of sports equipment having a desired stiffness or flexibility characteristic and, during play, switch to a different piece of sports equipment that is slightly more flexible or stiffer to suit changing playing conditions or to help compensate for weariness or fatigue. Such switching, of course, is subject to availability of different pieces of sports equipment from which to choose.

That is, subtle changes in the stiffness or flexibility characteristics of sports equipment may not be available between different pieces of sports equipment, because the characteristics may be fixed by the manufacturer from the choice of materials, design, etc. Further, the user must have the different pieces of sports equipment nearby during play or they are essentially unavailable to the user.

Turning to various types of sports, it can be seen how the lack of adjustability in stiffness and flexibility may adversely affect optimum performance of the player.

Hockey

Hockey includes, but is not limited to, ice hockey, street hockey, roller hockey, field hockey and floor hockey.

Hockey players may require that the flexure of the hockey stick be changed to better assist in the wrist shot or slap shot needed at that particular junction of a game or which the player was better at making. Players may not usually leave the field to switch to a different piece of equipment during play.

Younger players may require more flex in the hockey stick due to lack of strength; such flex may mean the difference between the younger player being able to lift the puck or not when making a shot since a stiffer flex in the stick may not allow the player to achieve such lift.

In addition, as the younger players ages and increases in strength, the player may desire a stiffer hockey stick, which in accordance with convention means the hockey player would need to purchase additional hockey stick shafts with the desired stiffness and flexibility characteristics. Indeed, to cover a full range of nuances of differing stiffness and flexibility characteristics, hockey players would have available many different types of hockey sticks.

Even so, the hockey player may merely want to make a slight adjustment to the stiffness or flexibility of a given hockey stick to improve the nuances of the play. Such would not be possible unless the multitude of hockey sticks included those having all such slight variations in stiffness and flexibility needed to facility such nuances.

U.S. Pat. No. 4,348,113 reveals insertion of juxtaposed mainstays into cavities of a shaft of a hockey stick to help the stick withstand excessive damage resulting from wear caused by abrasion as the butt side of the hockey blade scrapes or hits the ice. U.S. Pat. No. 5,879,250 reveals insertion of a core into a shaft of a hockey stick to help the stick stronger and more durable to withstand high strains during the course of play. A series of grooves are formed in the core in an attempt to attain a desire center of equilibrium.

Tennis

Tennis players also may want some stiffness adjustability in their tennis rackets and to resist unwanted torsional effects caused by the ball striking the strings during play. The torsional effects may be more pronounced in the case where the ball strikes near the rim of the racket rather than the center of he strings. Thus, it would be desirable to lock in the stiffness characteristic close to the rim as opposed to just at the handle end.

U.S. Pat. No. 4,105,205 reveals one or more rotatable beams of rectangular cross section arranged within a cavity of the tennis racket for radically changing its stiffness. U.S. Pat. No. 5,409,216 reveals a shaft in the form of a double head ends for improving the grip on the handle, which may change the stiffness or flexibility of the racket due to a change in orientation of the double head ends relative to the racket head. U.S. Pat. No. 3,833,219 reveals spacer discs in a tennis racket, each disc having a width that exceeds its thickness. The spacer discs, if made of metal, may be made in varied weights and thickness to allow for adjusted handle weight as well as for adjusted grip sizes.

Lacrosse

Lacrosse players use their lacrosse sticks to scoop up a lacrosse ball and pass the ball to other players or toward goal. The stiffness or flexibility of the lacrosse stick may affect performance during the game. Players may tire so some adjustment to the flexibility of the stick may be desired to compensate. With conventional lacrosse sticks, such adjustment is not available.

Other Racket Sports

Other types of racket sports also suffer from the drawback of being unable to vary the stiffness and flexibility of the racket during the course of play to suit the needs of the player at that time, whether those needs arise from weariness, desired field positions, or training for improvement. Such racket sports include racquetball, paddleball, squash, badminton, and court tennis.

For conventional rackets, the stiffness and flexibility is set by the manufacturer and invariable. If the player tires of such characteristics being fixed or otherwise wants to vary the stiffness and flexibility, the only practical recourse is to switch to a different racket whose stiffness and flexibility characteristics better suit the needs of the player at that time.

Golf

Golf clubs may be formed of graphite, wood, titanium, glass fiber or various types of composites or metal alloys. Each varies to some degree with respect to stiffness and flexibility. However, golfers generally carry onto the golf course only a predetermined number of golf clubs. Varying the stiffness or flexibility of the golf club is not possible, unless the golfer brings another set of clubs of a different construction. Even in that case, however, the selection is still somewhat limited.

Nevertheless, it is impractical to carry a huge number of golf clubs onto the course, each club having a slight nuance of difference in flexibility and stiffness than another. Golf players prefer taking onto the course a set of clubs that are suited to the player's specific swing type, strength and ability.

Skiing, Snowboarding, Snow Skating, Skiboarding

Skis are made from a multitude of different types of materials and dimensions, the strength and flexibility of each type differing to a certain extent. Skis include those for downhill, ice skiing, cross-country skiing and water-skiing. Other types of snow sports devices include snowboards, snow skates and skiboards. Beginners generally require more flex and, as they progress in ability, much less.

Skiers generally do not carry with them a multitude of different types of skis for themselves use during the course of the day to suit changing skiing conditions or to compensate for their own weariness during the day. The same holds true for those who use snowboards, snow skates and skiboards.

U.S. Pat. No. 3,300,226 reveals elongated bars in skis. Each bar may be rotated to a desired orientation to vary the stiffness and flexibility of the skis. The bars have a width that exceeds their thickness. U.S. Pat. No. 4,221,400 reveals set screws at one end of the skis used to keep the bars in desired orientations within the skis.

Ski Boots

Cross country and telemark skiing boots attach to the ski via a binding at the toe and have a free heel that allows the skier to stride on the snow in a motion similar to walking. The boots (or shoes) have flexible soles to allow a greater range of motion. Telemark bindings have a cable that runs around the heel of the boot to provide holding power, but also acts to exert pressure from the skier into the ski. Performance in cross country and telemark skiing can be greatly affected by the amount of pressure that is exerted by the skier through the boot/shoe into the ski. Different boots have different sole stiffness that skiers use to suit their particular style and needs.

Telemark skiers further change the amount of pressure that is transmitted into the ski by adjusting the tension on the cable. More tension will result in stiffening the sole of the boots and thus increase the pressure and control that the skier has over the ski. More sole stiffness provides more pressure which is needed for more control in steeper or icier conditions. Less stiffness reduces the pressure to allow for a smoother glide and more comfort in easier, flatter and softer snow conditions. It would be desirable to allow the skier to quickly and easily change the stiffness of the boot sole and thus change the amount of pressure that is to be transmitted into the ski, thereby altering the ski performance.

Snowboard Bindings

Snowboarders use a binding system attached to the snowboard that incorporates a highback, which entails resting the back of the rider's boot against a brace-like structure. This structure is typically 8–15 inches high and its purpose is to provide leverage from the rider's leg into the snowboard, thus affecting turning and edging power and control the rider has over the board. Additionally, some step-in type binding systems don't have this leverage device attached to the binding but incorporated into the snowboard boot itself. Regardless, each type of binding uses some method of stiffening the back of the boot to improve control.

It would be desirable to allow the rider to fine tune the degree of stiffness and thereby change the amount of force and leverage the rider transmits into the snowboard and thus vary the degree of control the rider has to suit certain conditions. For soft snow, the rider may want to have more flexibility so as to allow to board to float. For icier conditions, the rider may want to stiffen the highback to provide greater leverage and power, which results in greater edge control.

Bicycle Shoes

Bicycle specific shoes are rigid and attach to bicycle pedals usually through a binding or clip mechanism that prohibits the shoe from slipping off the pedal. The shoe is positioned on the pedal so the ball of the foot is directly over the pedal. The rider's foot flexes as the pedal moves through its range of motion and the rider depends on his/her foot and ankle strength to effect additional pressure onto the pedal and thus increase the speed or power delivery.

It would be desirable to supplement the rider's own ankle and foot strength by making the sole of the shoe stiffer and increasing the leverage the rider has on the pedal. Preferably, riders will be able to adjust the stiffness of the shoe sole according to their strength, road/course conditions.

Running Shoes, Training Shoes, Basketball Shoes

The transmission of the shoe wearer's strength (power) from their legs into the ground is directly affected by the sole stiffness of the shoe. Runners may gain more leverage and thus more speed by using a stiffer sole. Basketball players may also affect the height of their jumps through the leverage transmitted by the sole of their shoes. If the sole is too stiff, however, the toe-heel flex of the foot is hindered.

It would be desirable that the shoe wearer have the ability to tailor the sole stiffness to his/her individual weight, strength, height, running style, and ground conditions. Preferably, the shoe wearer may tailor the stiffness of the shoe sole to affect the degree of power and leverage that is to be transmitted from the wearer into the ground.

Batting

Sports such as baseball, softball, and cricket use bats to strike a ball. The batter may want to select a bat that is more stiff or flexible, depending upon the circumstances of play. Conventional bats only permit the batter to choose from among a variety of bats of different weights and materials to obtain the desired stiffness or flexibility. However, adjusting the stiffness or flexibility characteristics for a given bat is not feasible conventionally. Further, there is no practical way conventionally to determine which batting flexure and stiffness is optimal for batters with a single batting device.

Polo

Polo players use mallets during the course of the polo match. Changing the stiffness or flexibility characteristics is only available by exchanging for a different mallet with the desired characteristics.

U.S. Pat. No. 3,612,121 reveals a reinforcing rib within a hollow handle of a hand tool mallet (as opposed to a polo mallet). The rib has a width that is greater than its thickness.

Sailboating and Sailboarding

Masts of sailboats and sailboards support sails, which are subjected to wind forces. These wind forces, therefore, act through the sails on the mast. The mast may be either a rigid or flexible structure, which may be more desirable under certain sailing conditions. If the mast is flexible, tension wires may be used to vary the tension of the mast. Otherwise, the flexibility and stiffness characteristics of mast are generally fixed by the manufacturer, making it impractical to alter the mast flexibility or stiffness in different directions to suit changes in wind direction or the needs of the sailor.

Canoeing, Rowboating and Kayaking

Paddles for canoes, row boats, and kayaks are subjected to forces as they are stroked through water. The flexibility or stiffness of the paddles, while different depending upon its design and materials, is fixed by the manufacturer. Thus, a rower who desired to change such characteristics would need to switch to a different type of paddle. Carrying a multitude of different types of paddles for use with a canoe, row boat or kayak, however, is generally impractical for the typical rower from the standpoint of cost, bulk and storage.

Pole Vaulting

Pole vaulters use a pole to lift themselves to desired heights. The pole has flexibility and stiffness characteristics fixed by the manufacturer. The pole vaulter must switch to a different pole if the characteristics of a particular pole are unsatisfactory.

Fishing Rods

Fishing rods are flexed for casting out a line. The whip effect from the casting is affected by the stiffness or flexibility of the rod. Depending upon the fishing conditions and the individual tastes of the user, the user may prefer the rod to be either more flexible or more stiffer to optimize the whip effect of the cast. U.S. Pat. No. 3,461,593 reveals elongated inserts in a fishing rod that may be rotated or twisted to a desired orientation to vary the stiffness and flexibility of the rod. The inserts have a width that exceeds their thickness and may be configured into any of a variety of different geometric shapes.

As defined in this application, sports equipment covers any type of rod, stick, bat, racket, club, ski, board, mast, pole, skate, paddle, mallet, bicycle frame support bar, scuba fin, footwear, exercise machine or weight bench that is used in sports. The sports equipment flex either (1) to strike or pick up and carry an object such as a ball or puck (hockey, lacrosse, batting, golf, tennis, etc.), (2) to carry a person (pole vaulting, bicycle frame support bar), (3) to cast out a line (fishing rod), (4) to engage a frictional surface (such as skis or footwear against the ground, snow or water or scuba fins against the water), or (5) to respond to forces (such as the wind forces against a sail or muscular forces exerted when using an exercise machine or weight bench).

BRIEF SUMMARY OF THE INVENTION

One aspect of the invention resides in sports equipment that adjusts to provide variations in stiffness and flexibility. The sports equipment may have a shaft with an elongated cavity, an elongated flexure resistance spine, two locking elements that secure the spine against rotation at two spaced apart locations within the cavity. The spine is stiffer and less flexible in one direction than in another.

Another aspect of the invention resides in sports equipment that provides variations in stiffness and flexibility. The sports equipment may have an elongated cavity, means imparting stiffness and flexibility variations within the cavity so the sports equipment becomes more stiff and less flexible in one direction than in another, and two locking elements that secure the means against rotation in two spaced apart locations within the cavity.

A further aspect of the invention resides in a method of varying stiffness and flexibility, comprising providing sports equipment having an elongated cavity; imparting stiffness and flexibility variations within the cavity so the sports equipment becomes more stiff and less flexible in one direction than in a different direction; and securing against rotation at two spaced apart locations within the cavity while imparting the stiffness ad flexibility variations.

BRIEF SUMMARY OF THE INVENTION

For a better understanding of the present invention, reference is made to the following description and accompanying drawings, while the scope of the invention is set forth in the appended claims.

FIGS. 14 and 15 are a schematic representation of a top view of a pair of left and right skis each equipped with a dynamic tensioning system in accordance with a further embodiment.

FIG. 16 is a schematic representation of an end view of either of the skis of FIGS. 14 and 15 showing tension/rigidity selectors in accordance with the further embodiment.

FIGS. 17–19 are schematic representations of top, side and end views of a snowboard equipped with a dynamic tensioning system in accordance with a further embodiment.

FIG. 26 is a schematic representation of a top view of FIG. 25 with a torsion bending diagram illustrating the response to cyclist's weight shifts and force exerted on pedals.

FIG. 27 is a schematic representation of a top view of FIG. 25 with the frame shown to reveal the flexural resistance tensioning rod.

FIG. 28 is a schematic representation of the flexural resistance tensioning spine in progressive relative positions to vary rigidity and torsion.

FIG. 41 is schematic representations of a series of progressive views showing axes of flexural strength for I-beam geometry as the flexural resistance spine.

FIG. 42 is a schematic representation of progressive views showing changes in dynamic flexural set points to vary rigidity and flex characteristics.

FIG. 46 is a schematic representation of a side view of a hockey stick in accordance with a further embodiment.

FIG. 47 is a schematic representation of a front view thereof but without the blade.

FIG. 48 is a schematic representation of an interior of the hockey stick of FIGS. 46 and 47, but revealing a socket ratchet locking mechanism.

FIG. 49 is a schematic representation of knurl gears and a lock pin used to secure the flex position with respect to the embodiment of FIGS. 46–49.

DETAILED DESCRIPTION OF THE INVENTION

Figures 1, 2, 3:
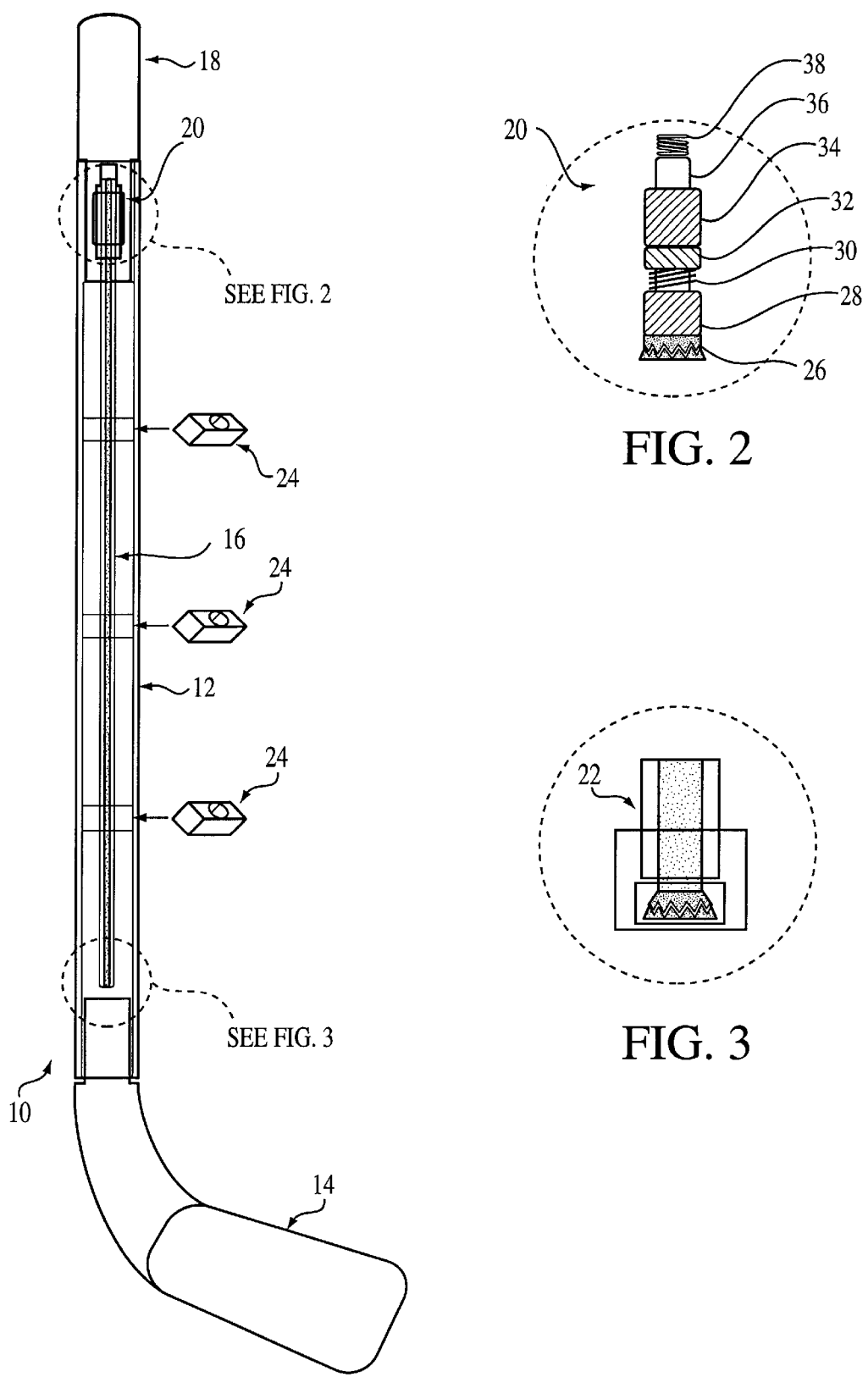
FIG. 1 is a schematic representation of a hockey stick in accordance with the invention and having spine node locks a serrated teeth locking mechanism, a knurled positioning mechanism and a flexure resistance spine.
FIG. 2 is a schematic enlarged representation of a knurled locking mechanism of FIG. 1.
FIG. 3 is a schematic enlarged representation of a serrated teeth locking mechanism of FIG. 1.

Turning to the drawings, FIG. 1 shows a hockey stick 10, which has a body that includes a hollow shaft 12 and blade 14. Also shown is a flexure stiffening rod or spine 16 extending through a majority of the length of the hollow shaft 12. The top open end of the shaft 12 is closed by a cap 18.

The spine 16 is secured at both ends in place by respective locking mechanisms 20, 22. Spaced along the length of the shaft 12 and the spine 16 are a plurality of spaced apart centering collars 24. The centering collars 24 may be made of rubber or other shock absorbing material, such as neoprene or silicon. Preferably, the centering collars each have a relatively tight tolerance and low coefficient of friction to facilitate the function of guiding the spine 16 into position. Alternatively, splined collars may be used to prevent the spine 16 from deflecting when severely flexed and enhancing holding power in high stress applications.

The advantage of securing the spine 16 at both ends is the elimination of torsion or roll-over of the spine 16 from twisting forces otherwise present during puck play with the hockey stick 10. The locking of the spine in two places such as at the vicinity of the ends ensures the flexible rigidity performance at each selected (manual) setting of the spine orientation relative to the shaft 12.

That is, the flexural and rigidity mechanical responses that are selected become manually locked into place. This ensures the setting will not jump out of its selected mechanical position from the performance desired due to twisting forces otherwise present. The locking mechanisms 20, 22 become anchor points, which mitigate energy absorption or attenuation of energy in the spine 16.

As compared with locking the spine at just one end, one would expect the spine to resist adverse torsional effects better when both ends of the spine are locked as opposed to just one end. Further, in the case of relatively longer spines, additional locking mechanisms may be positioned intermediate the two ends. These additional locking mechanisms further help the spine from being influenced by adverse torsional effects.

In addition, the spine 16 is held in compression within the shaft 12 by the locking mechanisms 20, 22 when a flexural resistance selection setting is locked. Such is advantageous in that energy is transmitted out of the shaft 12 at its terminus such as the hockey blade instead of being absorbed by the spine 16 itself.

Further, the dead stick feel is mitigated by minimizing energy shock absorption by the spine 16. Instead, energy is reflected back into the object such as a hockey puck. Such minimizing of energy shock is mechanically achieved by the locking mechanisms 20, 22, which expand to lock in the flexural resistance setting, thereby compressing a spring material. As a consequence, such force loading of the spring is believed to produce the reflection of energy when the hockey stick is used to strike the object such as the puck.

The centering collars 24 are used to center the spine 16 within the shaft 12 so as to mitigate or absorb any attenuation of the spine 16 during the strike-impact event with an object, thereby further minimizing the dead stick feel.

The locking mechanism 20 is shown in greater detail in FIG. 2. It has a positioning base plate 26 with locking teeth, a selecting knurl 28 with positioning locking teeth that engage those of the positioning base plate 26 and with a threaded portion 30, a knurled lock ring 32 threaded onto the threaded portion 30, a knurl 34 threaded onto the threaded portion 30, and a compression spring 38. The knurled lock ring 32 is between the selecting knurl 28 and the knurl 34. The knurl 34 is arranged to compress the spring 38 when fully unscrewed, but still engaged to the compression head 36 at the end of the knurl 28. The knurl 28 has the threaded portion 30 extended from it and the unthreaded end 36 more distal and extending from the threaded portion 30.

Referring to FIG. 3, the locking mechanism 22 includes serrated teeth assembly that engage to lock into position, but is able to rotate as is the spine 16 by 360 degrees when freed.

Figure 4:
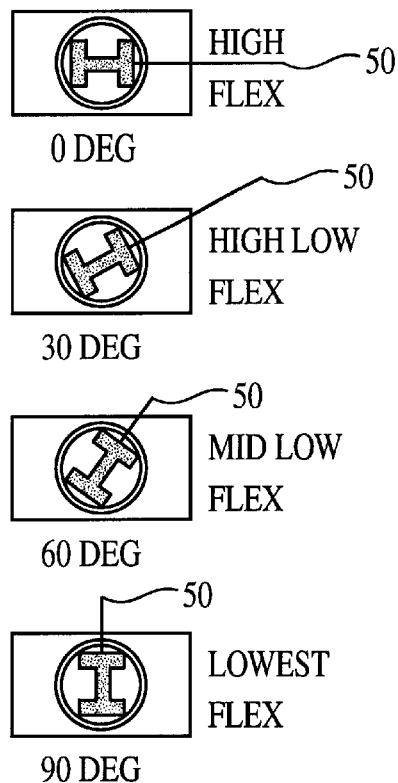
FIG. 4 is a schematic representation of progressive views of the flexure resistance spine of FIG. 1 shown in different relative positions.
Figure 5:
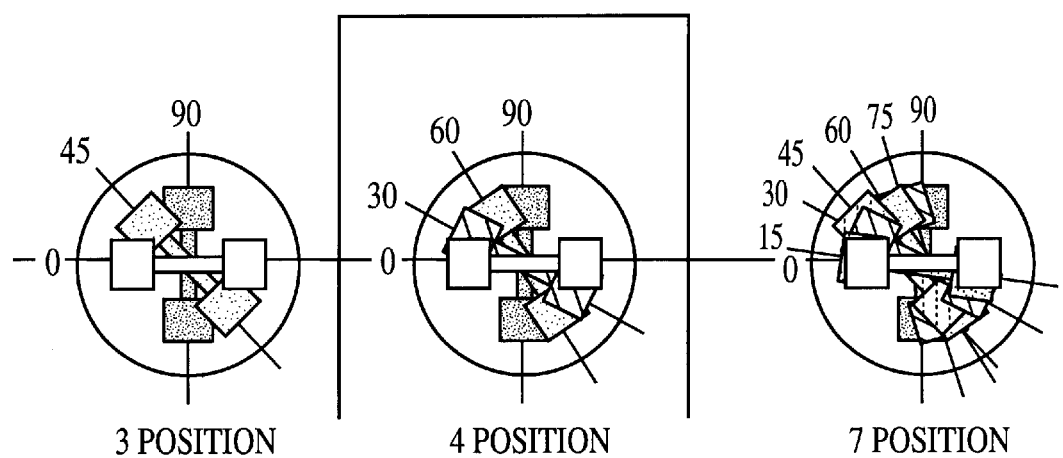
FIG. 5 is a schematic representation of the flexure resistance spine of FIG. 1 shown movable between three, four and seven relative position settings.

Turning to FIG. 4, the flexure resistance spine 16 may have an I-shape 50, or any other a variety of other types of shapes. As best seen in FIG. 5, the I-shape 50 changes its relative position within the shaft 12 dependent upon the position that it is rotated to enter in registry with the settings.

Turning again to FIG. 3, the angular sweep of 360 degrees divided by the number of serrated teeth equals the incremental angular sweep per tooth. When 180 degrees is divided by this incremental angular sweep per tooth, the result is the number of positions available. The following is exemplary of this calculation:

360 degrees/8 teeth=45 degree increments=3 positions.
360 degrees/12 teeth=30 degree increments=4 positions.
360 degrees/24 teeth=15 degree increments=7 positions.

Thus, the relative location of the flexural settings as best seen in FIG. 5 are:

3 positions=0, 45, 90 flexural setting angular locations
4 positions=0, 30, 60, 90 flexural setting angular locations
7 positions=0, 15, 30, 45, 60, 75, 90 flexural setting angular locations.

Neighboring the upper end of the shaft may be placed a designation to signify a reference location. Turning to FIG. 1, markings may be spaced about the periphery at the top of the flexure resistance spine 16, each representing different graduation in stiffness or flexibility. When the flexure resistance spine 16 is fully inserted within the cavity of the shaft 12, it still has a portion protruding out of the cavity. This protruding portion may have the markings signifying the different degrees of stiffness or flexibility.

Whichever of the markings aligns with the reference location designation on the shaft should be indicative of the stiffness or flexibility associated with the marking. Thus, the reference location designation should be located so when aligned with the marking on the flexure resistance spine signifying the most stiff or most flexible, the flexure resistance spine orientation coincides with that needed to impart the most stiff or most flexible characteristic to the shaft out of all the settings.

Figure 6:
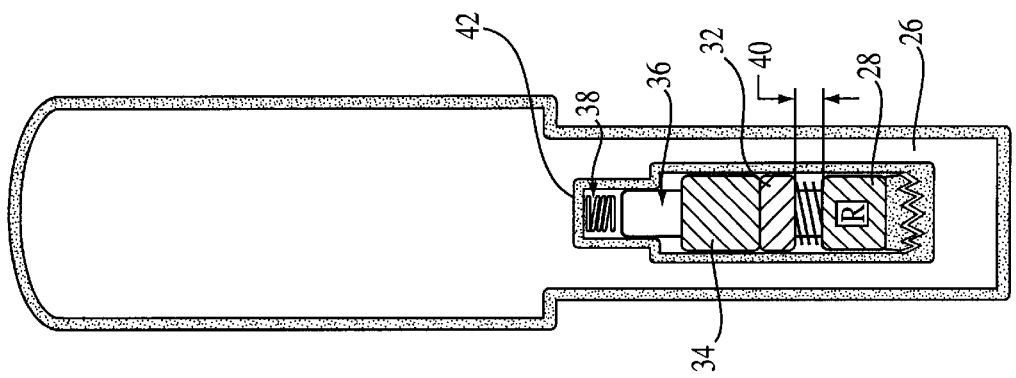
FIG. 6 is a schematic representation of the knurled locking mechanism of FIGS. 1 and 2 in a compressed condition.

FIG. 6 shows the locking mechanism 20 in an extended condition to effect locking. As a result of this condition, an extension distance 40, which is shown to define a gap that spaces apart the knurl 28 and the knurled lock ring 32.

Figure 7:
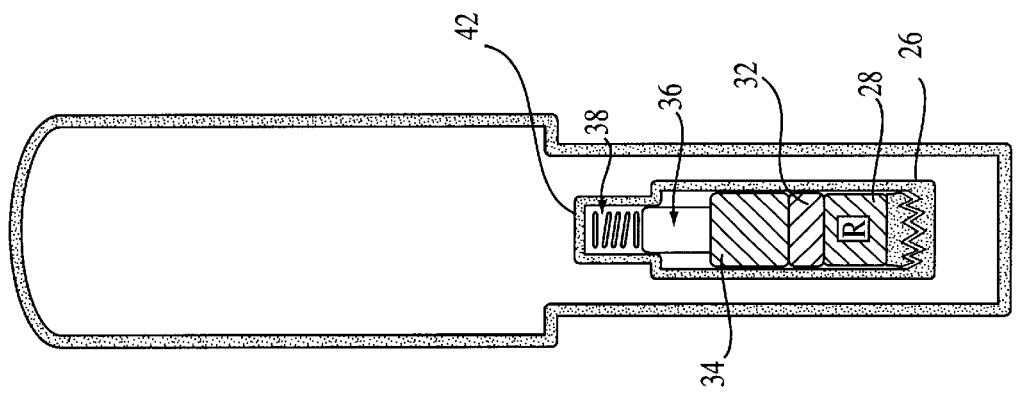
FIG. 7 is a schematic representation of the knurled locking mechanism of FIG. 6 in an uncompressed condition.

FIG. 7 shows the locking mechanism 20 in a compressed assembly condition with an unloaded spring 38 and no appreciable extension distance 40 being present. The compression head 36 is at a lower relative position in FIG. 7 than in FIG. 6, that is with respect to the end chamber 42 that contains the spring 38.

Figure 8:
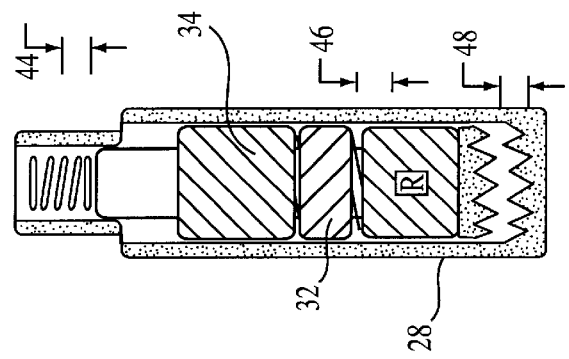
FIG. 8 is a schematic representation of the knurled locking mechanism of FIGS. 6 and 7 in an adjusting position.

FIG. 8 shows the relationship with respect FIGS. 6 and 7 between the spring displacement distance 44, the travel distance 46 and the adjustable distance 48. The spring displacement distance 40 is the amount of distance traveled by the spring while displacing from a compressed condition to a relaxed condition. The travel distance 46 is essentially the extension distance 40 of FIG. 6, but represents the distance the knurl 28 travels. The adjustable distance 48 represents the separation distance between the serrated teeth. Here, the spring displacement distance 42 is the same dimension as the travel distance 44, which in turn is the same dimension as the adjustable distance 48.

Figure 9:
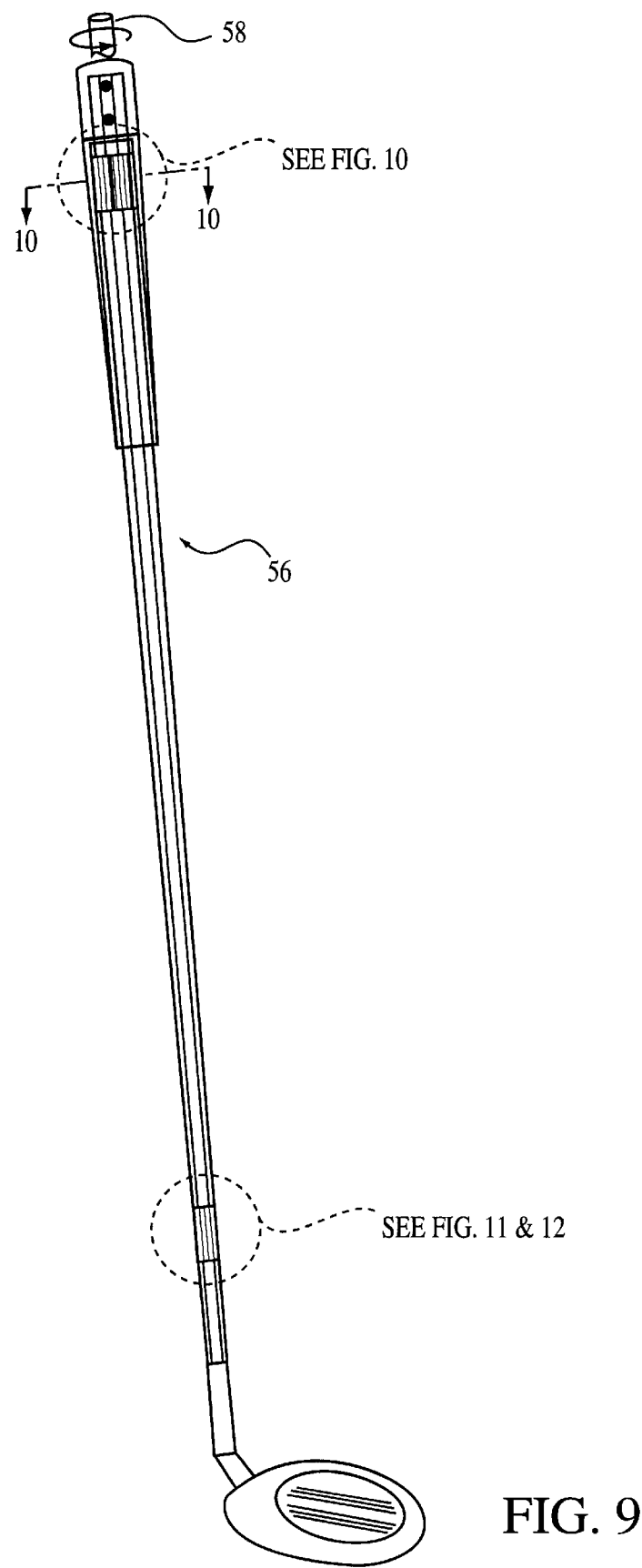
FIG. 9 is a schematic representation of a golf club.

FIG. 9 shows a golf club 56 containing the spine 16 of FIG. 1 together with a uni-directional clutch mechanism 60 that employs a uni-direction rotation to enter into a locking condition analogous to the socket wrench concept. Of course, the spine is dimensioned to fit within the golf club shaft, which is thinner than a hockey stick.

Figure 10:
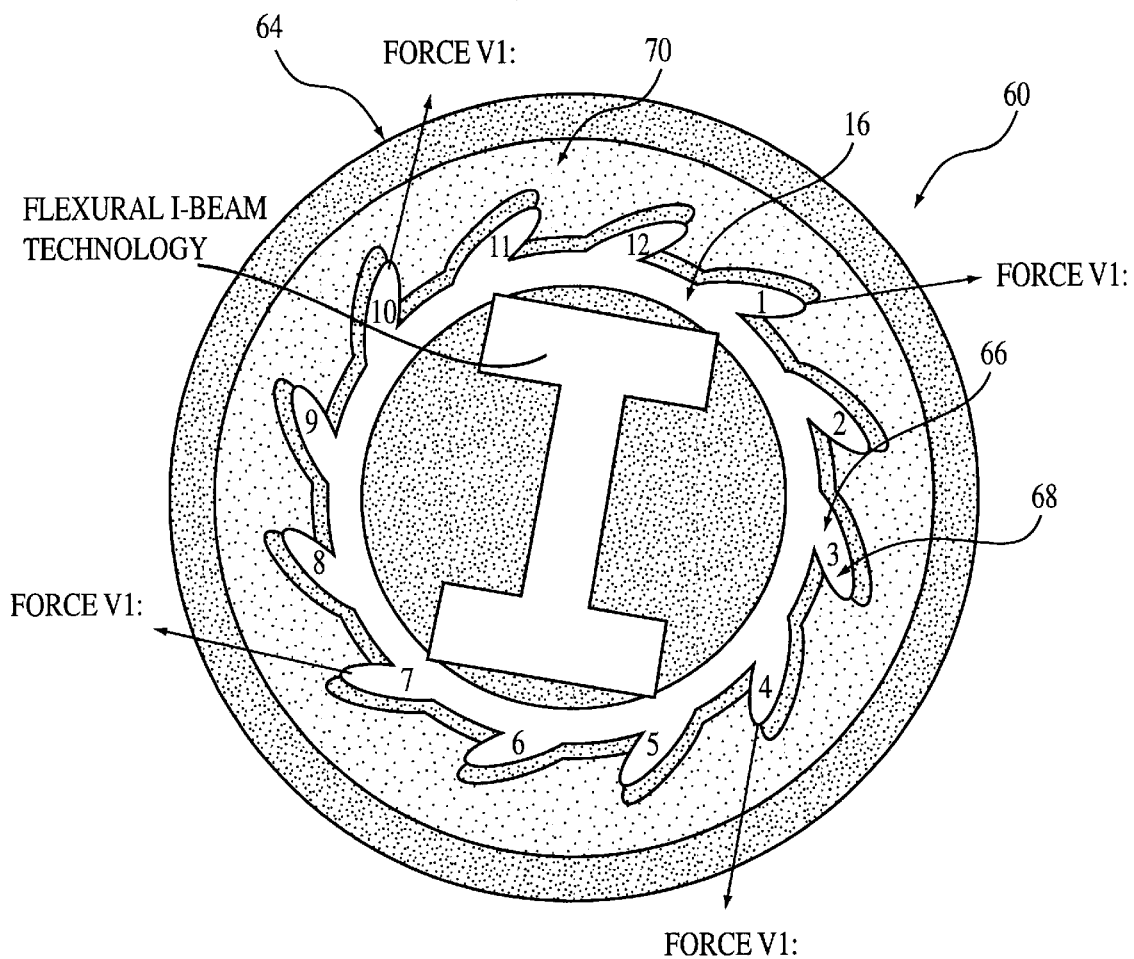
FIG. 10 is a cross section across 10—10 of FIG. 9 and which shows a unidirectional clutch mechanism and which replaces the knurled locking mechanism of FIG. 1.

The top end of the golf club 56 has a rigidity selector 58 that allows one direction of rotation of the spine. As best seen in FIG. 10, the unidirectional clutch mechanism 60 is at a location neighboring the rigidity selector 58 in the vicinity of the top portion of the golf club 56.

The unidirectional clutch mechanism 60 is within the golf club outer wall 64 and includes a snap ring 66 whose snap-fit fingers 68 engage in a lock ring anchor 70 that is bounded by the golf club outer wall 64. The force components V1 are shown as well.

In the embodiment of FIG. 10, twelve snap-fit fingers 68 are used to effect a snap-fit connection, which means that for a 360 degree full rotation, each turn from one snap-fit finger to its neighbor would traverse an angular sweep of 30 degree. This means that there are 30 degree lock adjustments for each incremental change in the flexural position of the spine 16. The spine 16 is shown here having a flexural I-shape movable in association with the rotatable movement of the snap ring 66.

Figures 11, 12:
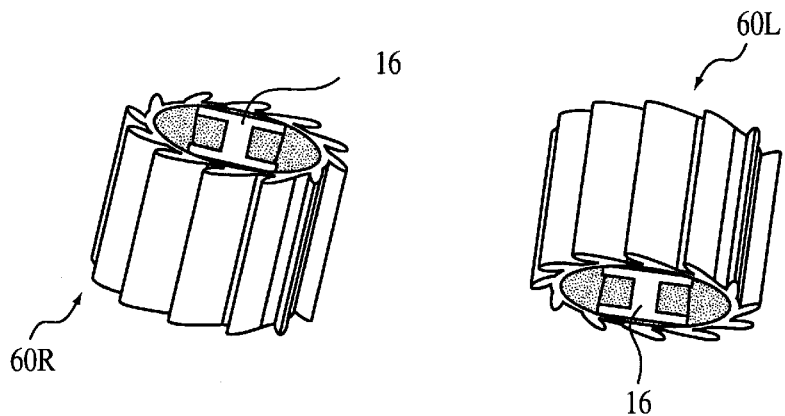
FIG. 11 is a schematic representation of a right handed locking teeth mechanism, which replaces the serrated teeth locking mechanism of FIG. 3 within a golf club.
FIG. 12 is a schematic representation of a left handed locking teeth mechanism, which may replace to right handed locking teeth mechanism of FIG. 11.

For a right faced club, the rigidity selector 58 rotates clockwise to lock the face against further clockwise rotation. For a left faced club, the rigidity selector rotates counterclockwise, locking the face against further counter-clockwise rotation. FIGS. 11 and 12 respectively show right and left handed unidirectional clutch mechanisms.

FIG. 11 shows a perspective view of the right hand unidirectional clutch mechanism 60R (and FIG. 12 is of the left hand unidirectional clutch mechanism 60L) with central I-beam shape spine 16 used in the lower portion of the golf club 56. This provides for two spaced apart locations along the length of the shaft of the golf club 56 to secure the spine 16. These two locking locations lock the torsion of the golf club shaft, creating a more accurate golf club, because the rotation of the head of the club is redundantly and mechanically prevented from rotating.

Figure 13:
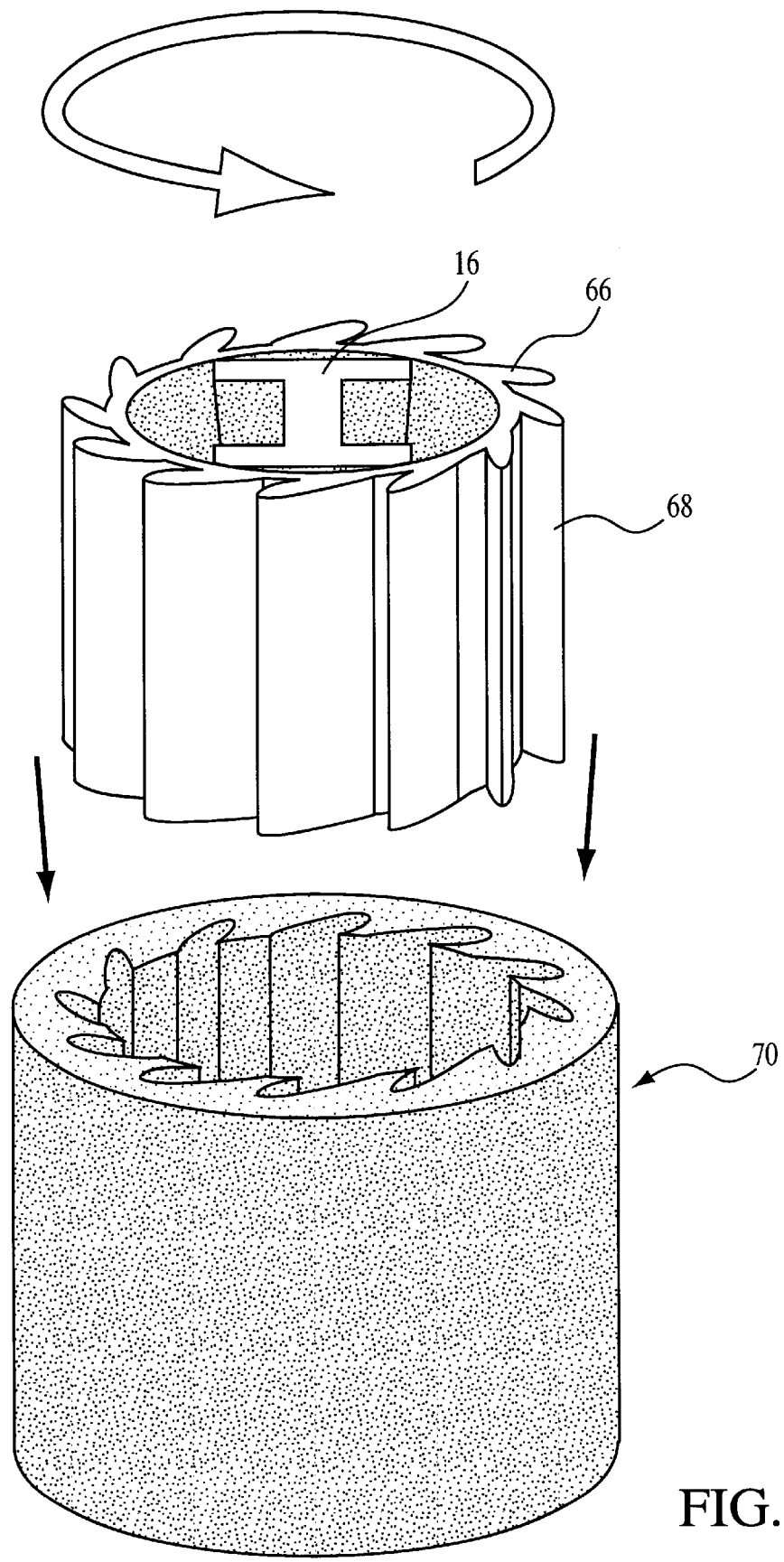
FIG. 13 is a schematic representation of an exploded perspective view of a right handed locking teeth mechanism used in FIG. 11.

FIG. 13 shows the manner in which the unidirectional clutch mechanism is assembled. The lock ring 66 is inserted into the snap ring 68 such that the snap-fit fingers 68 are accommodated in respective recesses in the snap ring 68 that conform in shape to that of the snap-fit fingers. Preferably, the snap-fit fingers are arranged one after another so as to be directed in a clockwise direction. Note that a left hand clutch mechanism such as that of FIG. 12 would have the snap-fit fingers direct in a counter-clockwise direction.

FIGS. 14–16 show the flexure resistance spine 16 being used on a pair of skis 72 having bindings 74. A tension rigidity selector is provided in the form of a lever 76 that may be lifted upwardly from the position shown in FIGS. 14–16. As the lever 76 raises, the flexure resistance spine 16 simultaneously rotates to change the flexural performance of the skis at the ends 78, 80. The lever 76 may be locked to secure the changed flexural performance position by folding the lever to the left or right side in a direction perpendicular to the vertical lift. The spines 16 are arrange to the outside of the binding 74 footprint.

Figure 20:
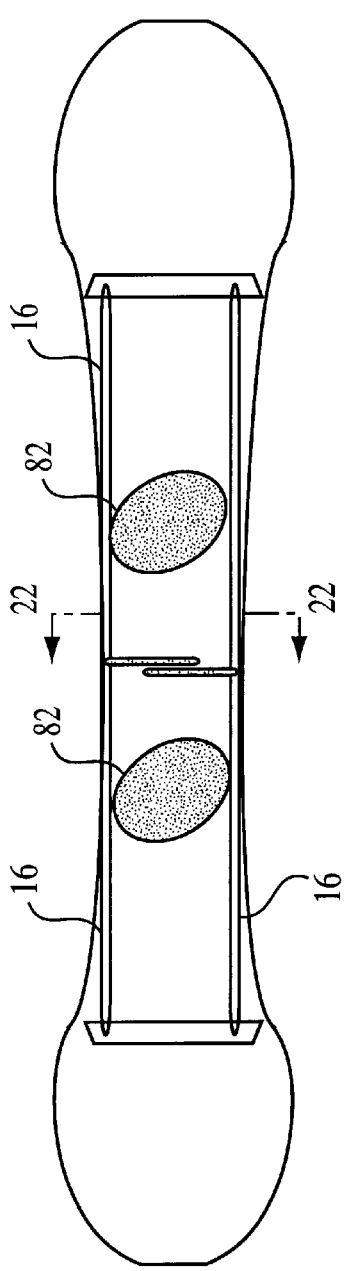
FIGS. 20–22 are schematic representations of top and end views and a cross-section across 22—22 of FIG. 20 to show a snowboard equipped with a flexural resistance dynamic tensioning system in accordance with another embodiment.
Figure 21:
Figure 22:

FIGS. 17–22 show arrangements for using the flexure resistance spines 16 on snowboards, thereby providing a dynamic tensioning system for slalom and mogul terrain. In the embodiment of FIGS. 17–29, the spines 16 are arranged beneath the binding footprints 82. In the embodiment of FIGS. 20–22, the spines 16 are arranged to the outside of the binding footprints 82. A lever 84 is provided that is analogous to the lever 76 of FIGS. 14–16 is operative in the same manner to rotate the flex spines 16 and to secure the position by locking in position.

Figure 23:
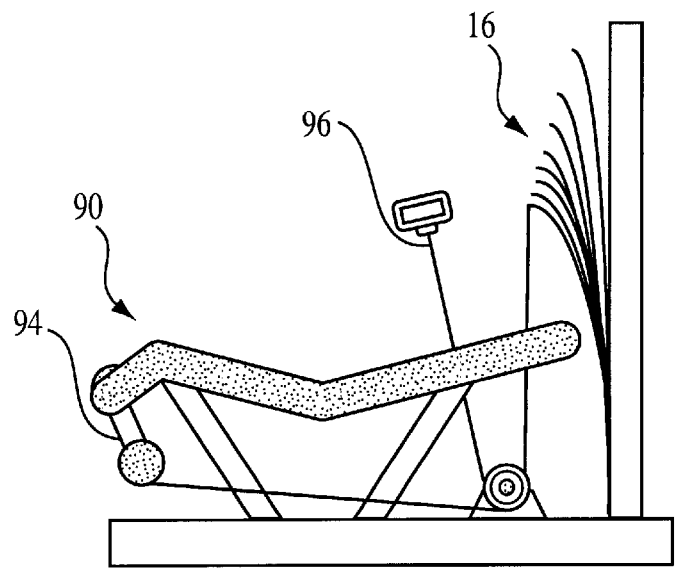
FIGS. 23 and 24 are schematic representations of elevational side and elevational end views of a universal bench equipped with a flexural resistance tensioning system of the present invention.
Figure 24:
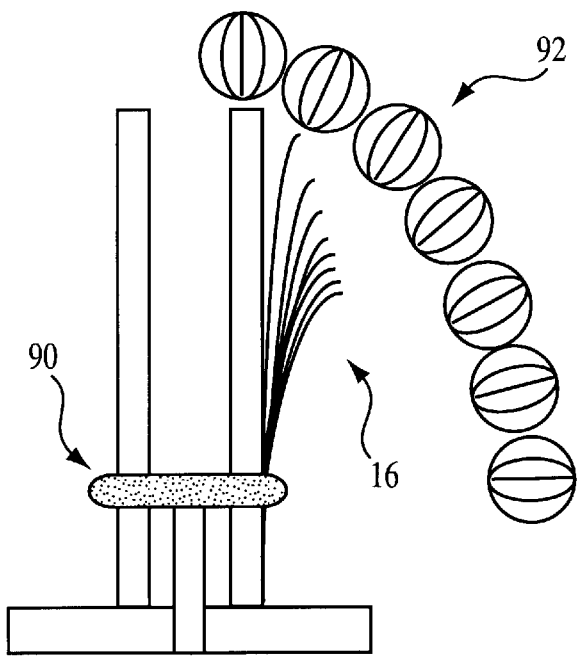

FIGS. 23 and 24 show arrangements for using the flexure resistance spines 16 of universal benches 90 designed for exercising that strengthens the quadriceps, hamstrings, chest, triceps, biceps and back muscles. The cross section wall thickness of the spines 16 in this embodiment is proportional to the flexural resistance for ovoid geometry 92 orientation of the spines 16. The end of the spine 16 is secured to a resistance wire or cable to tension at 94 for quadriceps and hamstring exercises and at 96 for the chest, triceps, biceps and back exercises. Instead of a universal bench, the spines may be used in any type of exercise machine or weight bench that exerts resistance to muscular forces.

Figure 25:
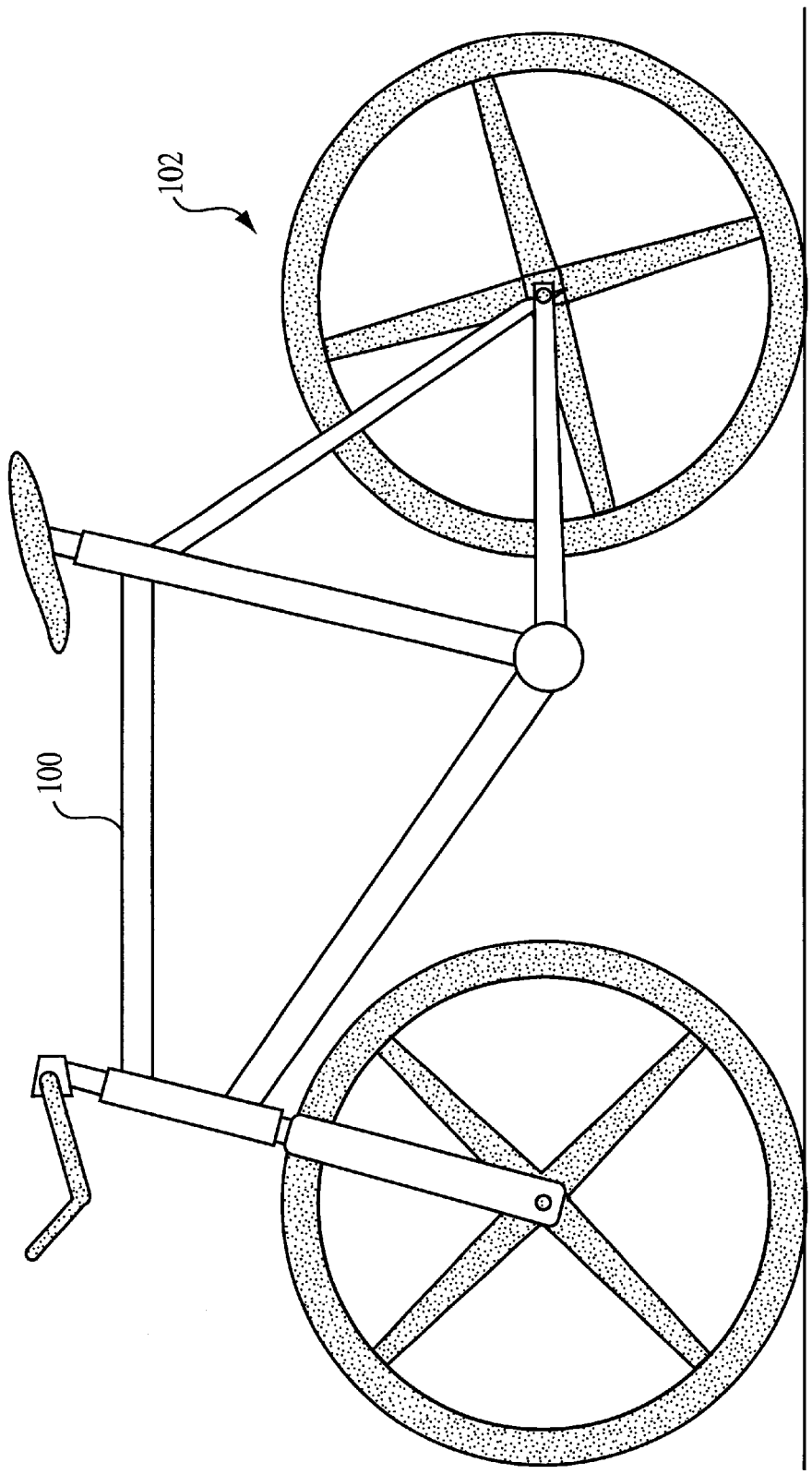
FIG. 25 is a schematic representation of an elevational view of a bicycle equipped with a flexural resistance tensioning system of the present invention.

FIGS. 25–27 show the use of the flexural resistance spine 16 being an extrusion with the main frame rod 100 of a bicycle 102. As seen in FIG. 26, torsion, or bending of the main bicycle frame rod occurs as cyclists shift their weight while riding and the force exerted upon the pedals. As is shown in FIGS. 27, access is provided to rotate the spine 16, which may have an I-shape (see FIG. 28), into any one of various different relative orientations.

With reference to FIG. 28, the maximum rigidity and minimum torsion is attained with the orientation of the uppermost I-beam orientation shown and the minimum rigidity and maximum torsion is attained with the orientation of the lowermost I-beam orientation shown. To minimize torsion, maximize the forward energy. The cyclist may adjust to optimize riding conditions in view of weight shifting and pedal forces. For instance, the adjustment of the flexural resistance spine 16 provides the cyclist with the ability to alter ride conform and the ability to absorb shocks transmitted from the wheels in a manner analogous to a suspension system.

Figure 29:
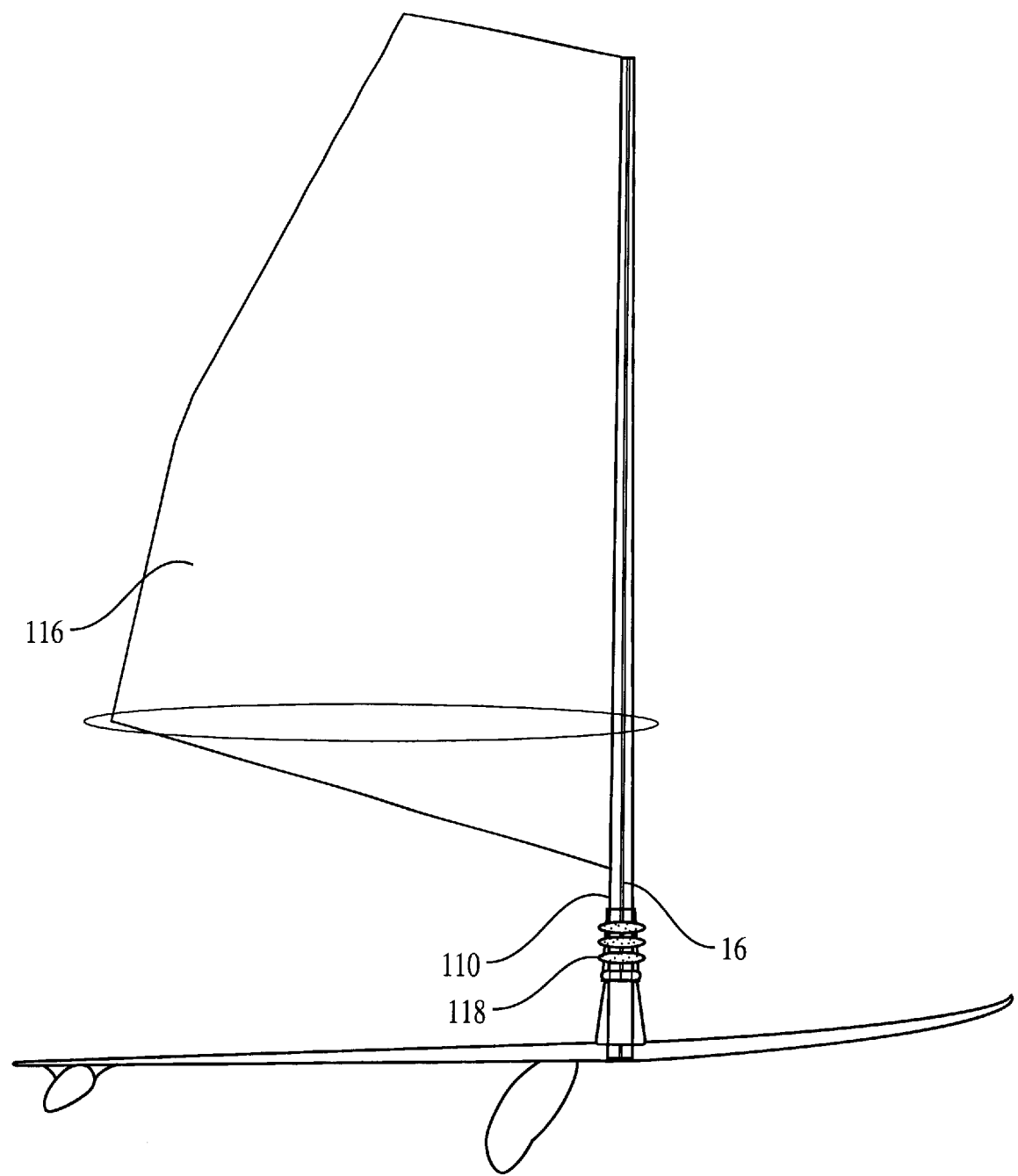
FIG. 29 is a schematic representation of a windsurfing board equipped with a flexural resistance system in its mast in accordance with the invention.
Figures 30, 31:
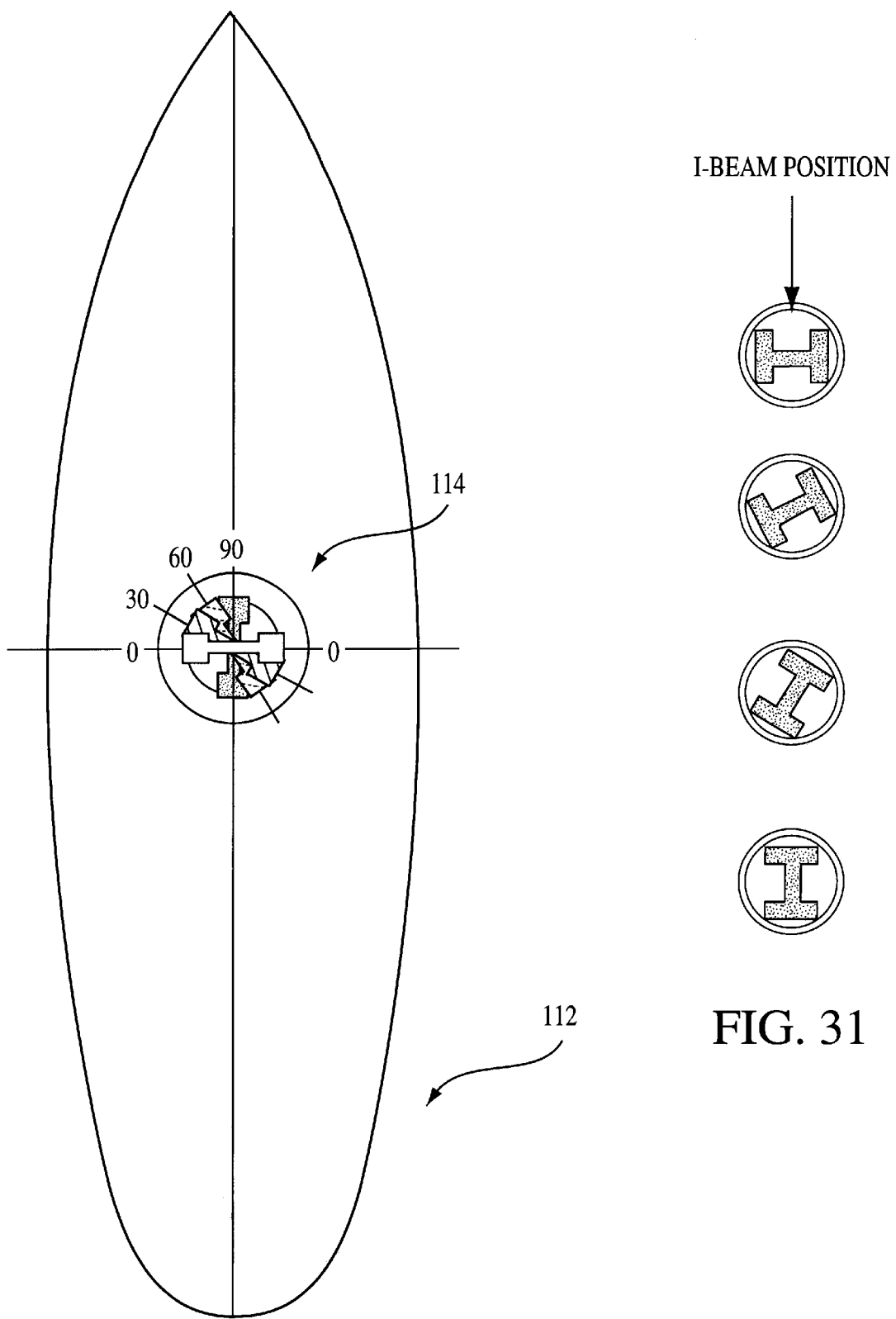
FIG. 30 is a top view of FIG. 29 but without the sail and showing the progressive relative positions of the resistance spine.
FIG. 31 is a schematic representation of the resistance spine in progressive relative positions from turning to vary rigidity and flexibility.
Figures 32, 33:
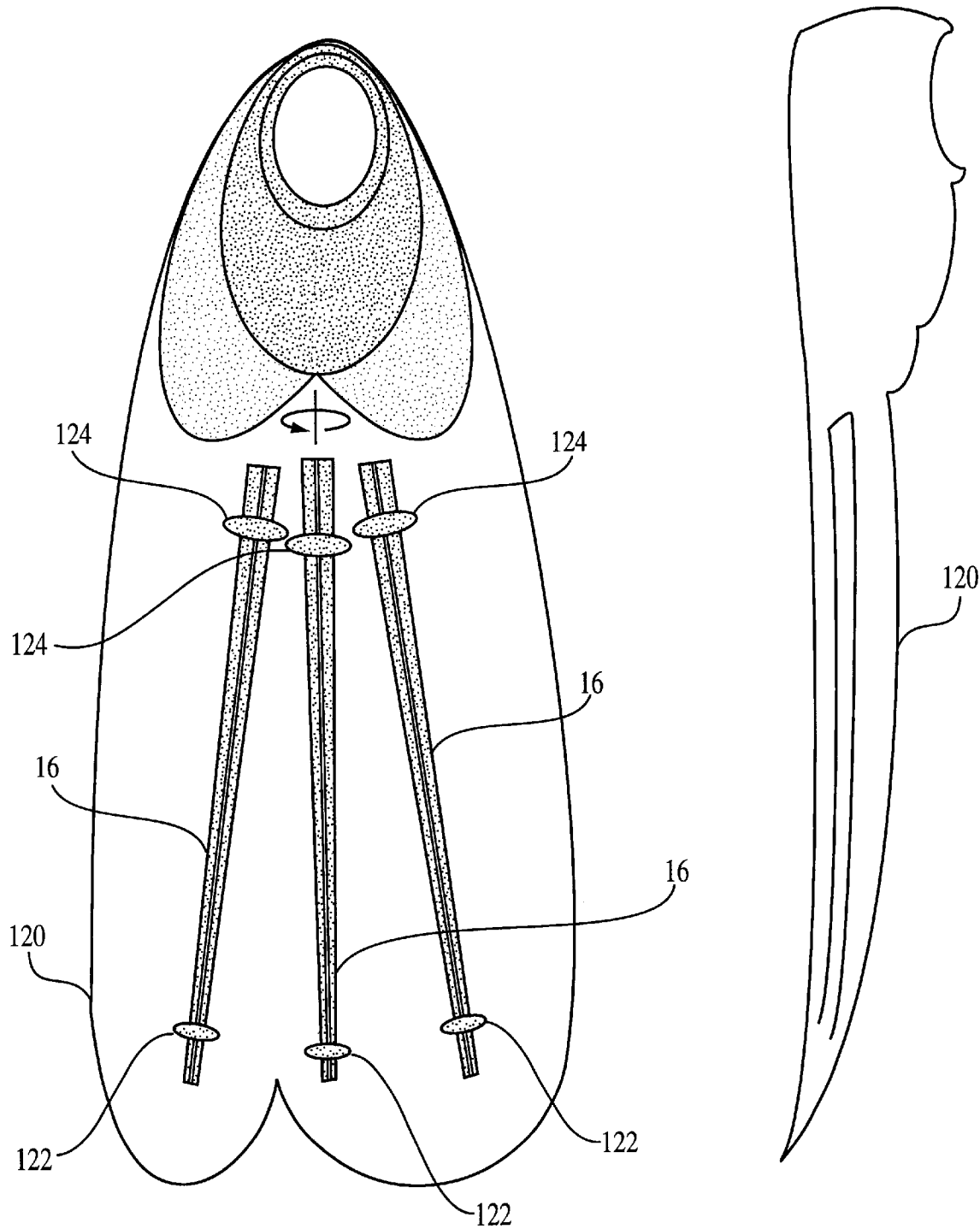
FIG. 32 is a schematic representation of a bottom view of a scuba fin equipped with a flexural resistance system of the present invention.
FIG. 33 is a schematic representation of a side view of FIG. 32, which is symmetric/identical with a view from the opposite side thereof.

FIGS. 29–31 show the flexural resistance spine 16 is use within the mast 110 of a windsurf board 112. The relative orientations that the spine 16 may be rotated into is shown generally at 114 in FIG. 30, which are individually represented in FIG. 31 with respect to the I-beam shape. The sail 116 is arranged so that the wind may exert a perpendicular force to the sail. The mast 110 may be formed of a composite material whose center includes the spine 16.

A flex position locking collar 118 is provided so that the I-beam shape of the spine 16 is fixed to the a desired flexural setting and moves with the windsurf board's tacking, windward and leeward sail movements and maintains flex position within the mast.

Figures 34, 35:
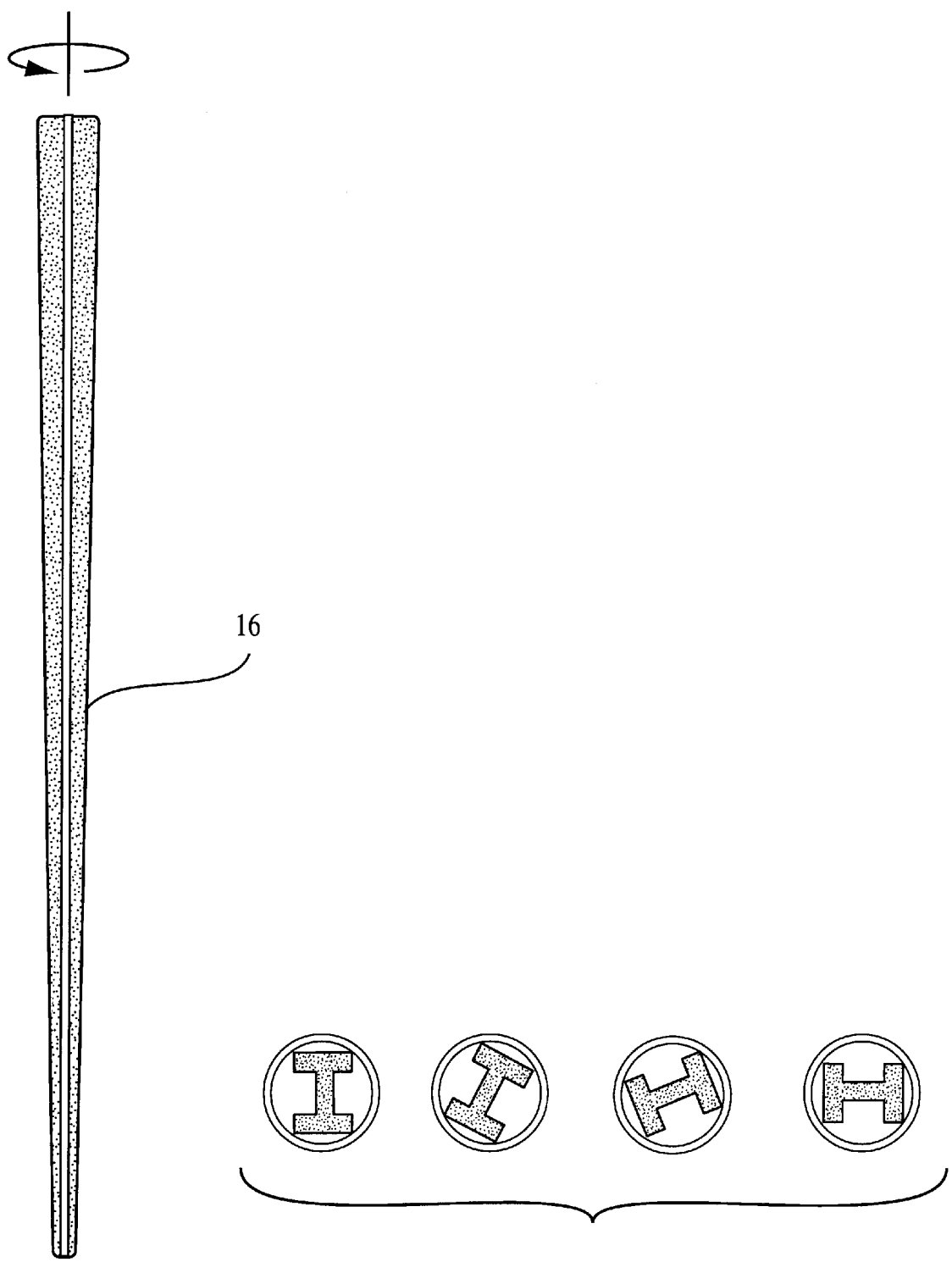
FIG. 34 is a schematic representation of a flexural resistance spine in accordance with the invention that is used in the scuba fin of FIGS. 32 and 33.
FIG. 35 is a schematic representation of progressive relative positions of the spine of FIG. 34 due to turning to vary rigidity and stiffness.

FIGS. 32–35 show the spines 16 arranged in scuba fins 120. Each spine may be rotated to the desired relative orientation. As seen in FIG. 35, such variable orientations change the relative position of the I-shape configuration that runs the full length of the spine 16. At each end region of the spine 16 are respective locking elements 122, 124 that engage the spine 16 to lock the same in position relative to its orientation on the scuba fin. The locking elements 122, 124 may each be annular and friction fit onto the spine. The bottom of the scuba fin may have a configuration adapted to friction fit the locking elements in position.

To vary the flexural characteristics, the spine 16 is pulled linearly out of friction fit engagement with the locking elements 122, 124, rotated such as in the clockwise direction shown to the desired relative position, and then pushed linearly to engage with the locking elements 122, 124.

Figure 36:
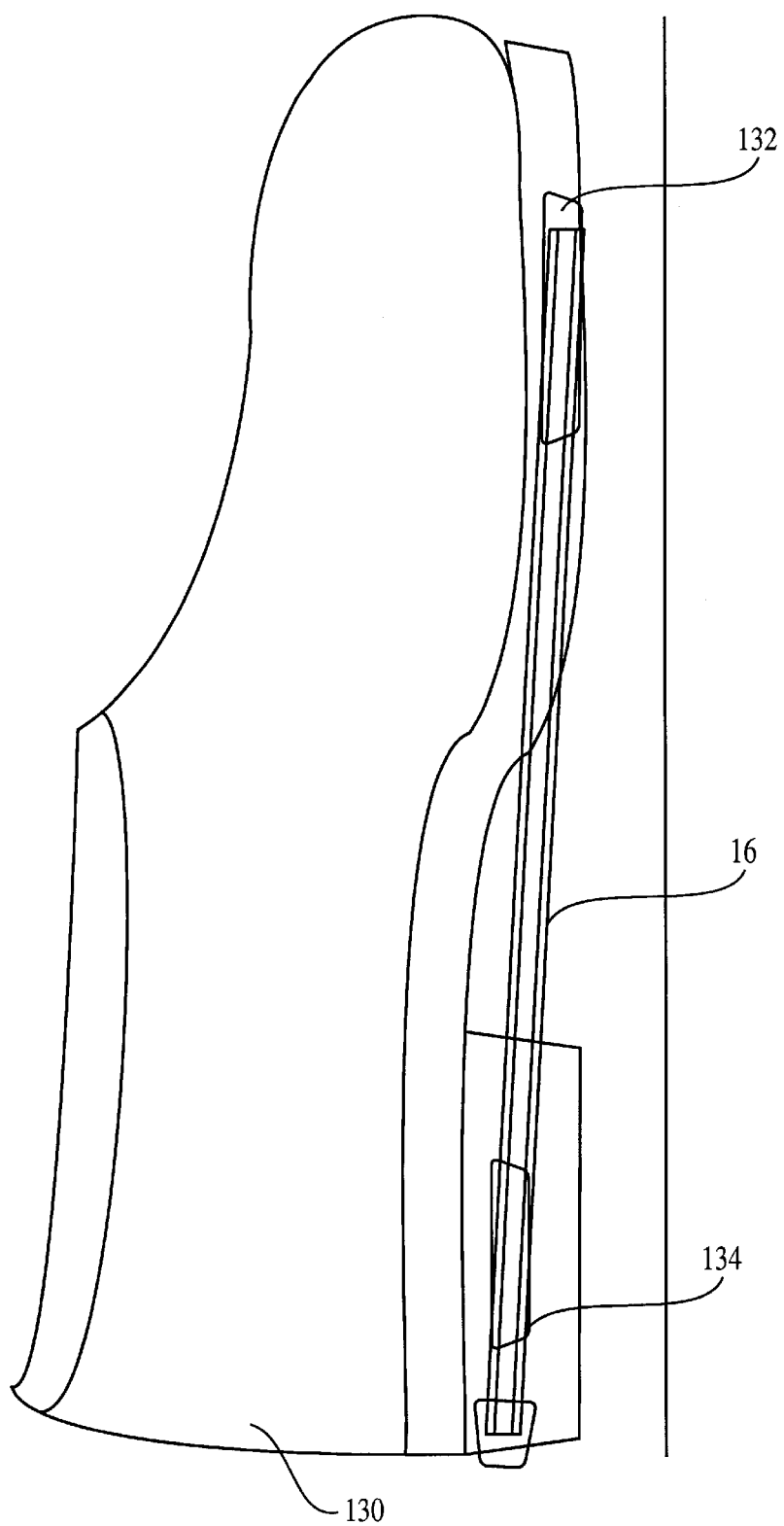
FIG. 36 is a schematic representation of a shoe equipped with the flexural resistance spine of the present invention.
Figure 37:
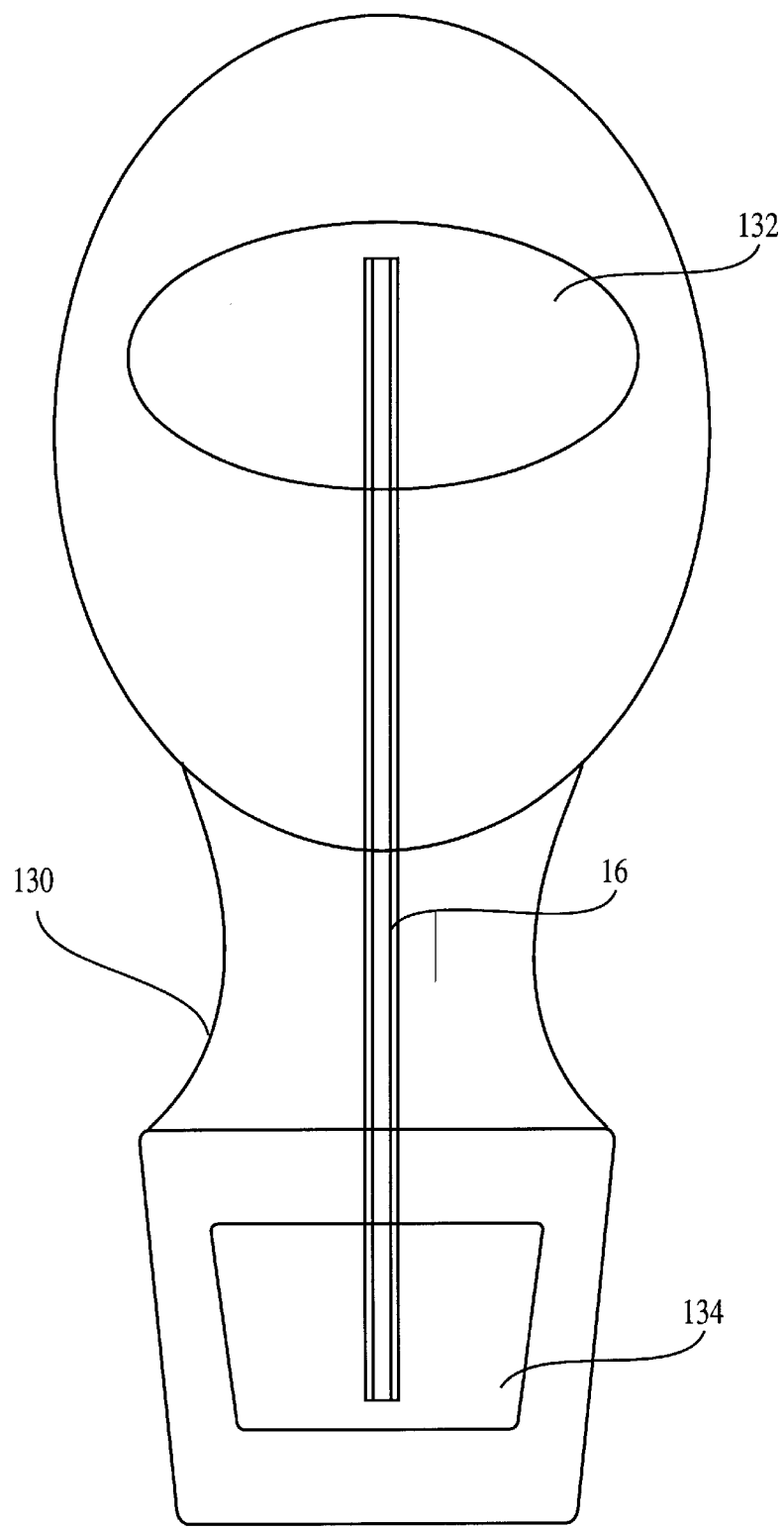
FIG. 37 is a bottom view of the shoe of FIG. 37.
Figure 38:
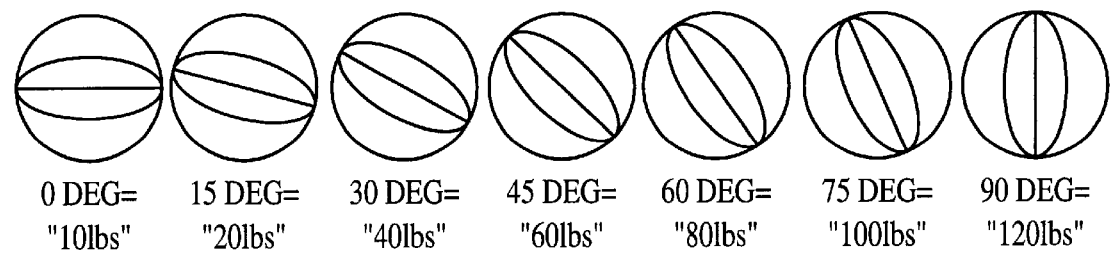
FIG. 38 is a schematic representation of a series of progressive views of a flexural resistance spine being rotated in a clockwise direction into different relative angular positions to vary stiffness and resistance characteristics in a given direction.
Figure 39:
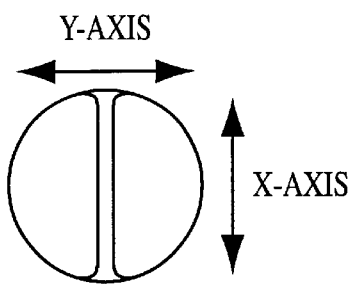
FIG. 39 is a schematic representation of an I-beam geometry flexural resistance spine with an indication of X and Y axes.
Figure 40:
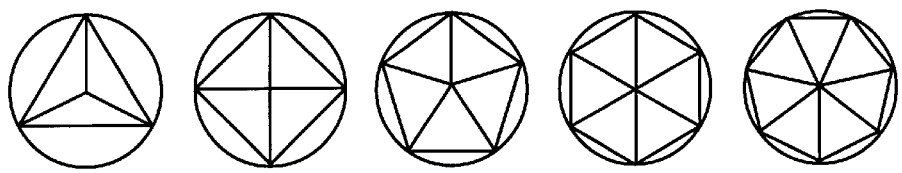
FIG. 40 is a schematic representation of alternative geometries that may be substituted for the I-beam geometry of FIG. 39.

FIGS. 36 and 37 show the spine 16 used on footwear such as a hiking shoe 130. The sole and heel of the shoe are each equipped with cavities 132, 134 between which extends the spine 16, which may have an I-beam shape for its entire length or another geometry that provides different stiffness coefficients in different directions. A force plate may be inserted within each of the cavities to receive the locking elements 122, 124. Locking may be effected with a rachet engagement to vary the relative position of the I-beam shape.

FIGS. 39, 40, 41, 42 and 43 show different suitable geometries that the spine in any of the embodiments may have. By rotating such geometries, the stiffness or torsion characteristics in particular directions may vary.

Figure 43:
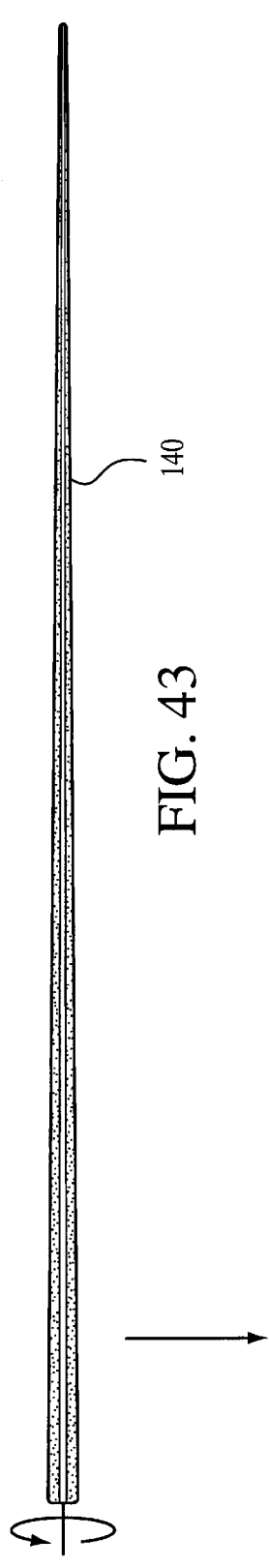
FIG. 43 is a schematic representation of a tapered spine in accordance with the invention.
Figure 44:
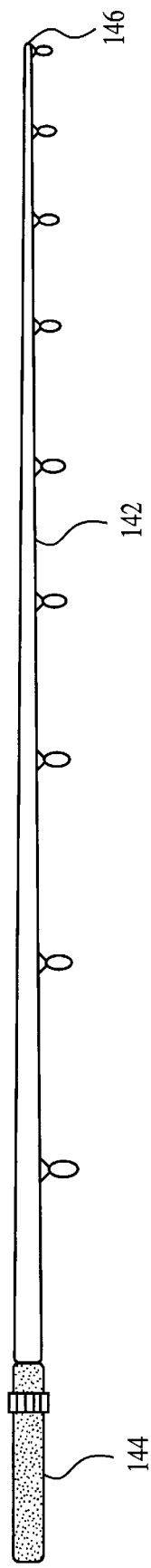
FIG. 44 is schematic representation of a fishing pole that is hollowed in accordance with the invention.
Figure 45:
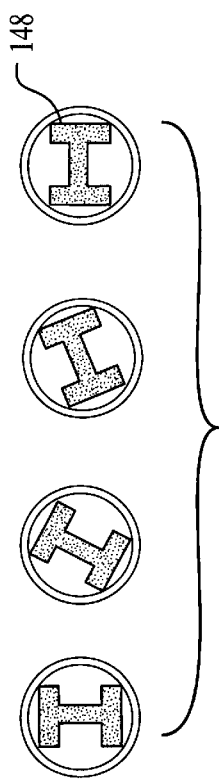
FIG. 45 is a schematic representation of the tapered spine of FIG. 43 within the hollow of the fishing pole of FIG. 44.

FIGS. 43–45 show a tapered spine 140 that is fitted into a hollow cavity of the fishing rod 142. Preferably, the tapered spine 140 extends from the proximal butt 144 of the handle of the fishing rod 142 to the distal tip 146 of the fishing rod 142.

If the fishing rod is of a two-piece construction as opposed to a one-piece as shown, then either two separate tapered spines are used (one for the upper half of rod and the other for the lower half of the rod) or the two separate tapered spines screw or otherwise attach together when the upper and lower halves of the fishing rod are joined so as to in effect provide for a continuous spine. Locking elements are arranged neighboring the butt of the handle of the fishing rod and as far as feasible toward the tip of the fishing rod. The locking elements may be the same as for the hockey stick or golf club embodiments, for instance, except they need to lock to a tapered spine.

FIG. 45 shows the relative position of the spine during its rotation within the fishing rod. The I-shape cross-section 148 that is shown for the spine is exemplary only.

FIGS. 46–49 show a hockey stick 150 with an elongated cavity 152 into which is inserted an elongated double flute or tapered spine 154. Opposite ends of the spine 154 are secured with a socket ratchet 156 at one end and knurl gears 158 and locking pin 160 at the other end.

Figures 50, 51:
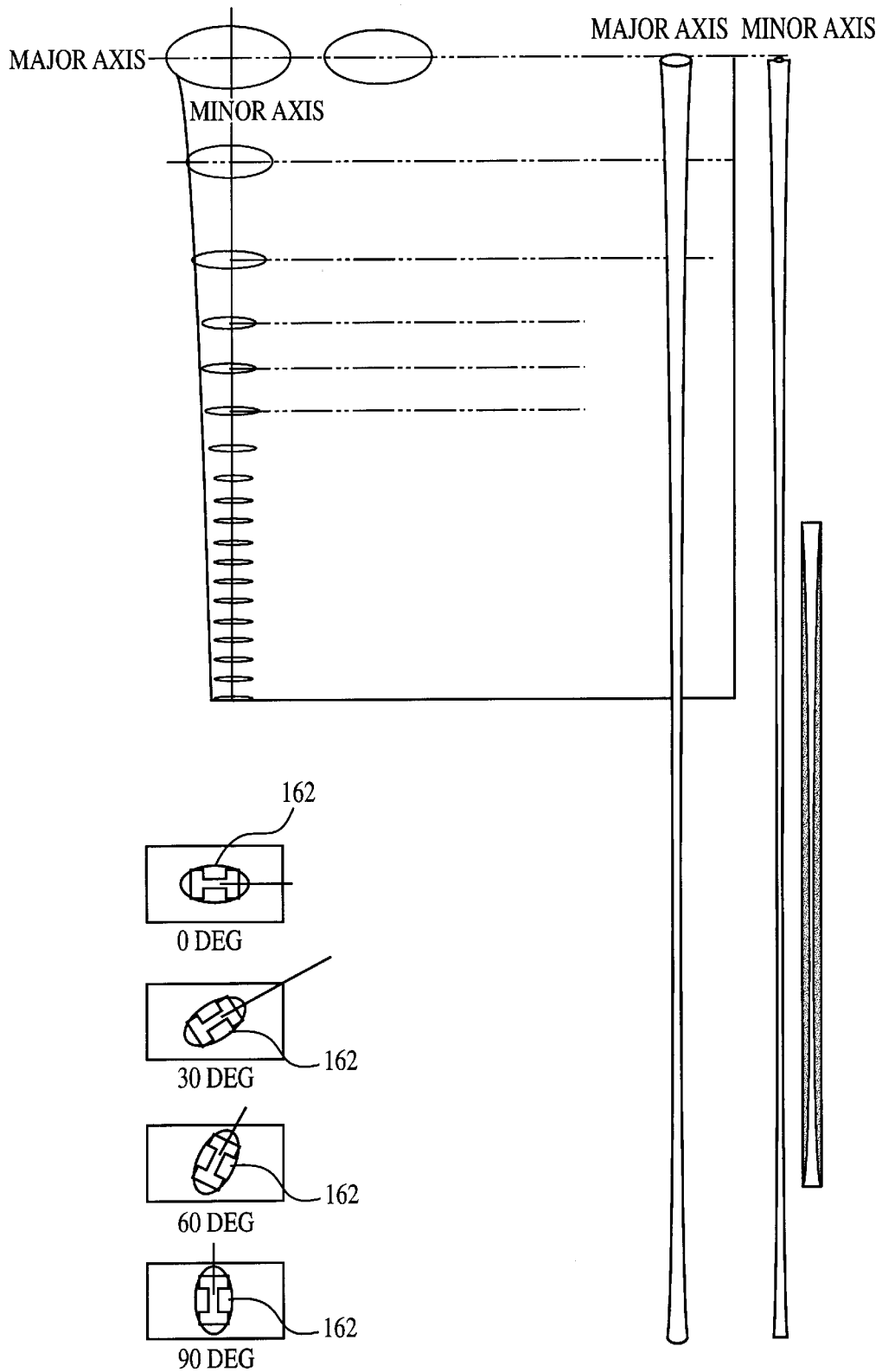
FIG. 50 is a schematic representation of a double flute/taper ellipsoidal I-beam with respect to a major axis and a minor axis. Also shown are ellipsoidal cross-sections that are graduated for a double wall I-beam.
FIG. 51 is a schematic representation of progressive views of the I-beam of FIG. 50 showing change in a relative orientation that result in variations of flexure.

FIGS. 50 and 51 show an exemplary spine 154 that has an ellipsoidal I-beam shape 162 with asymmetric cross-sections. The spine 154 is double fluted or tapered to increase or decrease the mechanical flex characteristics, e.g., the thinner or flatter portion has the smaller minor ellipsoid axis whose cross-section is of double wall I-beam shape and is extremely rigid. On the other hand, the wider or ovoid portion has the larger minor ellipsoid axis whose cross-section is of double wall I-beam shape that is less rigid, more flexible. FIG. 51 shows the relative orientation of the spine rotating from the top to the bottom views of high flex to low flex.

Each of these pieces of sports equipment as exemplified by the embodiments may be in a sense split up into multiple sections, each with its own adjustable flexibility and stiffness. The flexure resistance spines 16 may be stepped or tapered and need not be of uniform dimension.

While the cross-sectional shape of the flexure resistance spine 16 is common in each of the embodiments, the actual dimensions may vary depending upon the actual piece of sports equipment to which the flexure resistance spine is to be used. In all embodiments, it is preferred that the length of the flexure resistance spine reach a majority of the length of the piece of sports equipment to which it is used and that the spine be secured at two spaced apart locations (neighboring respective ends of the spine).

For the sake of brevity, the sports equipment such as a hockey stick or a lacrosse stick will be referred to as a stick; sports equipment such as a baseball bat, softball bat and cricket bat will be referred to as a bat; sports equipment such as a tennis racket, paddleball racket, squash racket, court tennis racket and badminton racket will be referred to as a racket; golf club will be referred to as a club; an archery bow will be referred to as a bow; a fishing rod with be referred to as a rod; a water ski, a downhill ski and a cross-country ski will be referred to as a ski; a snow board or skiboard will be referred to as a board; a snow skate will be referred to as a skate; a pole vault pole and a ski pole will be referred to as a pole; an oar or paddle will be referred to collectively as a paddle; a polo mallet will be referred to as a mallet, a windsurf board mast will be referred to as a mast; a bicycle frame support will be referred to as a bar; a scuba fin will be referred to as a fin; an exercise machine, universal bench or weight bench with be referred collectively as a bench; and hiking shoes or other types of shoes will be referred to as footwear.

This list is not intended to be exhaustive; any other sports equipment is included within the definition of sports equipment. What is common is that they flex either: in response to striking or picking up and carrying an object or person, in response to forces acting upon them such as wind forces or muscular forces or in response to engaging frictional surfaces such as the ground, snow or water.

A reference marking may be provided at the end of the sports equipment neighboring where the flexure resistance spine 16 protrudes. The reference marking is arranged to signify the greatest stiffness or flexibility for a particular direction when an appropriate marking or indicia of the flexure resistance spine is turned to be coincident with the reference marking.

It is preferred that the flexure resistance spine 16 be rotatable in response to manual turning forces. If not, however, then the flexure resistance spine 16 may be removed from its position in the sports equipment, turned to the desired orientation and then inserted once more back into the cavity.

The actual configuration of the flexure resistance spine 16 may be any desired configuration in which the stiffness in one direction is greater than in a different direction and the flexibility is greater in the different direction than the one direction. That is, where both the one direction and the different direction are directed transverse to the longitudinal axis, in contrast to being coincident with it.

In each of the embodiments, the materials of the flexure resistance spine may be fabricated of any material having desired flexibility and stiffness characteristics. Such materials include, but are not limited to, metals, woods, rubber, thermoplastic polymers, thermoset polymers, ionomers, and the like.

The thermoplastic polymers include the polyamide resins such as nylon; the polyolefins such as polyethylene, polypropylene, as well as their copolymers such as ethylene-propylene; the polyesters such as polyethylene terephthalate and the like; vinyl chloride polymers and the like, and the polycarbonite resins, and other engineering thermoplastics such as ABS class or any composites using these resins or polymers. The thermoset resins include acrylic polymers, resole resins, epoxy polymers, and the like.

Polymeric materials may contain reinforcements that enhance the stiffness or flexure of the flexure resistance spine 16. Some reinforcements include fibers such as fiberglass, metal, polymeric fibers, graphite fibers, carbon fibers, boron fibers and the like.

In addition, the protruding portion of the flexure resistance spine 16 may be freely accessible from the end of the piece of sports equipment or be enclosed by a suitable cap or handle end so that removal of this cap or handle would be necessary to gain access to the flexure resistance spine from the cavity and effect its removal. However, if the flexure resistance spine is freely turned within the cavity, then its removal would not be necessary to alter the direction of stiffness and flexibility if provision were made so that rotation of the cap or handle resulted in rotation of the flexure resistance spine.

Regardless of the sport, having the ability to change the flexibility and stiffness of the sports equipment affords an additional advantage in that it may be used as a training aid, allowing the player or teacher to instantly change only the flex and stiffness characteristics of the sports equipment, without altering the swing weight, grip size, feel, etc. This permits the focus of training to be only on the flex and not other factors.

Further, being able to change the flex or stiffness characteristics has real value for retail shops and pro shops where fitting of the sports equipment to suit the customer's needs is done. Thus, such shops are able to identify the sports equipment's flex that conforms to the customer's preference by adjusting the stiffness and flexibility of the present invention. Thereafter, an appropriate piece of sports equipment may be selected whose specific stiffness and flex characteristic matched that of the sports equipment flex identified with the present invention.

In any of the embodiments, the spine 16 may be double walled, tapered longitudinally, asymmetric in cross-section, of variable shape along its length such as circular to elliptical to triangular, flared and/or fluted. Further, depending upon the application, the spine may be constructed of materials to render them relative more rigid (as for hockey) or semi-flexible (as for golf).

The object is to adjust the flexibility of a shaft by rotating a spine within the shaft. This affects the longitudinal flex and may be made to affect the torsional flex and the kick or hinge point of flexure (where maximum flexure bending forces arise).

A shaft includes any tube-like structure by itself, attached to the outside of another surface or incorporated within a structure. Examples of a tube-like shaft by itself include hockey sticks, golf clubs, lacrosse sticks, pole vaulting poles, fishing rods, sailboard/sailboard masts, canoe/kayak paddles or oars, baseball bats, archery bows, tennis racquets and exercise machine tensioning rods. Examples of products to which a tube-like shaft might be attached externally include skis, snowboard bindings and bicycle frames.

A spine includes any longitudinal structure whose flexure is different in one plane than another, in any increment of 0 to 90 degrees. This can be achieved using many materials. Examples of design shapes that have this property include, but are not limited to, I-beams, ovals, stars, triangles, stacked circles, ellipses, etc. The spine may be solid or hollow in construction and utilize combinations of different materials and material thicknesses to achieve the preferred flexibility profile and characteristics.

A distinct advantage is the ability to maintain consistent flex adjustment as well as affect torsional flex. This advantages arises from the adjustment being locked in at the ends of the spine and, depending upon the application, at one or more additional locations through the length of the spine.

While the foregoing description and drawings represent the preferred embodiments of the present invention, it will be understood that various changes and modifications may be made without departing from the spirit and scope of the present invention.

What is claimed is:

1. A sports apparatus with variations in stiffness and flexibility, comprising:

sports equipment having a body;

an elongated flexure resistance spine that is stiffer and less flexible in one direction than in a different direction; and locking elements that secure the spine against rotation at two spaced apart locations along the body.

2. An apparatus as in claim 1, wherein the locking elements are configured to allow the spine to become disengaged, the spine being arranged to rotate into a different position relative to the body and then be engaged by the locking elements while in the different position and thereby become locked in position.

3. An apparatus as in claim 1, wherein the spine has a transverse cross-section configured as any one of an I-shape, triangular shape, diamond shape, star shape, polygonal shape, or elliptical shape.

4. An apparatus as in claim 1, further comprising an indicator attached to the spine with markings indicative of different degrees of stiffness.

5. An apparatus as in claim 1, wherein the spine has a width and a thickness, the width being greater in magnitude than the thickness.

6. An apparatus as in claim 1, wherein the sports equipment is selected from a group consisting of a stick, a racket, a club, a bat, a board, a mast, a ski, a board, a mast, a pole, a paddle, a bow, a mallet, a bar, a fin, a rod, a bench and footwear.

7. An apparatus as in claim 1, wherein the locking elements include any one of mating teeth, friction fits, snap-fits and socket ratchet connections.

8. An apparatus as in claim 1, wherein the body includes a cavity, the spine being within the cavity, the locking elements being arranged to secure the spine against rotation within the cavity.

9. An apparatus as in claim 1, wherein the spine has a configuration that is any one of flared, fluted and tapered.

10. An apparatus as in claim 1, further comprising a marking arranged on the body to signify a degree of stiffness or flexibility of the flexures resistance spine relative to an orientation of the flexure resistance spine with respect to the body.

11. An apparatus as in claim 1, further comprising at least one further locking element that secures the spine against rotation with respect to at least one further location along the body that is spaced from the two spaced apart locations.

12. A sports apparatus with variations in stiffness and flexibility, comprising:

sports equipment having a body;

an element imparting stiffness and flexibility variations to the body so the sports equipment becomes more stiff and less flexible in one direction than in a different direction; and locking elements arranged to secure the spine against rotation at two spaced apart locations along the body.

13. An apparatus as in claim 12, wherein the element is an elongated flexure resistance spine that has a width and a thickness, the width being greater in magnitude than the thickness.

14. An apparatus as in claim 13, wherein the body has a cavity, the spine being within the cavity, the locking elements being arranged to secure the spine against rotation within the cavity.

15. An apparatus as in claim 12, further comprising a marking arranged one the body to signify a degree of stiffness or flexibility of the flexure resistance spine relative to an orientation of the flexure resistance spine with respect to the body.

16. An apparatus as in claim 12, wherein the sports equipment is selected from a group consisting of a stick, a racket, a club, a bat, a ski, a pole, a bow, a paddle, a mallet, a bar, a fin, a rod, a bench and footwear.

17. An apparatus as in claim 12, wherein the locking element includes any one of mating teeth, friction fits, snap-fits and socket ratchet connections.

18. An apparatus as in claim 12, wherein the spine has a configuration that is any one of flared, fluted and tapered.

19. An apparatus as in claim 12, further comprising an indicator attached to the spine with markings indicative of different degrees of stiffness.

20. An apparatus as in claim 12, further comprising at least one further locking element that secures the spine against rotation with respect to at least one further location along the body that is spaced from the two spaced apart locations.

21. A method of varying stiffness and flexibility, comprising:

providing sports equipment having a body;

imparting stiffness and flexibility variations to the body so the sports equipment becomes more stiff and less flexible in one direction than in a different direction; and securing the element against rotation at two spaced apart locations along the body.

22. A method as in claim 21, wherein the body has a cavity, the imparting including inserting into the cavity a flexure resistance spine that is elongated and fits within the cavity, the spine having a width and a thickness, the width being greater in magnitude than the thickness.

23. A method as in claim 21, further comprising orienting the spine relative to the body based on a marking of a degree of stiffness or flexibility of the flexure resistance spine.

24. A method as in claim 21, wherein the locking includes any one of mating together teeth, friction fitting, snap-fitting and socket ratchet connecting.

25. A method as in claim 21, wherein the spine has a configuration that is any one of flared, fluted and tapered.

26. A method as in claim 21, further comprising securing the element against rotation with respect to at least one further location spaced from the two spaced apart locations along the body.

* * * * *